US012754638B1

(12) United States Patent
Sun et al.

(10) Patent No.: US 12,754,638 B1
(45) Date of Patent: Oct. 6, 2026

(54) ADAPTIVE NOISE REDUCTION IN TOUCHSCREEN DEVICES

(71) Applicant: STMicroelectronics International N.V., Geneva (CH)

(72) Inventors: Guodong Sun, Beijing (CN); Da Man, Beijing (CN); Bin Fan, Beijing (CN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 19/186,002

(22) Filed: Apr. 22, 2025

(51) Int. Cl.
*G06F 3/041* (2006.01)
*G06F 3/044* (2006.01)

(52) U.S. Cl.
CPC ...... *G06F 3/04182* (2019.05); *G06F 3/04166* (2019.05); *G06F 3/0446* (2019.05)

(58) Field of Classification Search
CPC . G06F 3/04182; G06F 3/04166; G06F 3/0446
See application file for complete search history.

(56) References Cited

U.S. PATENT DOCUMENTS

2011/0157069 A1* 6/2011 Zhuang ................. G06F 3/0445 345/174
2012/0200524 A1* 8/2012 Vallis .................. G01R 35/005 324/613
2013/0257767 A1 10/2013 Wu et al.
2015/0062042 A1 3/2015 Shin
2019/0212874 A1 7/2019 Nathan et al.
2023/0333691 A1 10/2023 Kang et al.
2024/0112666 A1 4/2024 M et al.

* cited by examiner

*Primary Examiner* — Abhishek Sarma
(74) *Attorney, Agent, or Firm* — Slater Matsil, LLP

(57) ABSTRACT

A method for operating a touchscreen device. The method includes performing a noise monitoring scan on the touchscreen device, collecting noise data from the noise monitoring scan, determining whether the noise data is greater than a first noise threshold and less than a second noise threshold and, if so, whether the noise data is greater than the second noise threshold, the second noise threshold being larger than the first noise threshold, entering a first noise mode to apply a first noise filter in response to the noise data being greater than the first noise threshold and less than the second noise threshold, and entering a second noise mode to apply a second noise filter in response to the noise data being greater than the second noise threshold.

17 Claims, 11 Drawing Sheets

1000a

1000b

ADAPTIVE NOISE REDUCTION IN TOUCHSCREEN DEVICES

TECHNICAL FIELD

The present invention relates generally to electronic devices and, in particular embodiments, to a system and method for reducing noise interference in touchscreen devices.

BACKGROUND

Touchscreens are commonly used in electronic devices, such as tablets, smartphones, wearable devices, and computers. Touch screen devices typically include sensing nodes that can detect touch inputs from a user's finger or stylus. Touch input can be detected by measuring changes in capacitance at the sensing nodes. The changes in capacitance can indicate the presence and location of touch inputs on the touchscreen. In addition to touch inputs, noise can cause changes in capacitance at the sensing nodes. The changes in capacitance at the sensing nodes caused by noise can be misinterpreted as a touch input.

Noise from various sources, such as power supplies, phone chargers, display components and other electronic devices, can generate electromagnetic noise that can interfere with accurate touch detection. When the noise levels become elevated, touch detection accuracy may be impacted, potentially leading to inaccurate touches or false touch detections. Touch controllers can employ various noise filtering techniques to provide reliable touch detection in noisy environments.

SUMMARY

One general aspect includes a method of operating a touchscreen device. The method includes: performing a noise monitoring scan on the touchscreen device; collecting noise data from the noise monitoring scan; determining whether the noise data is greater than a first noise threshold and less than a second noise threshold and, if so, whether the noise data is greater than the second noise threshold, the second noise threshold being larger than the first noise threshold; entering a first noise mode to apply a first noise filter in response to the noise data being greater than the first noise threshold and less than the second noise threshold; and entering a second noise mode to apply a second noise filter in response to the noise data being greater than the second noise threshold.

Another general aspect includes a method of operating a touchscreen device. The method including: performing a first noise monitoring scan on the touchscreen device; collecting first noise data from the first noise monitoring scan; determining that the first noise data is greater than a first noise threshold and less than a second noise threshold, the second noise threshold being larger than the first noise threshold; entering a first noise mode in response to the first noise data being greater than the first noise threshold and less than the second noise threshold; performing a second noise monitoring scan on the touchscreen device; collecting second noise data from the second noise monitoring scan; determining that the second noise data is greater than the second noise threshold; and entering a second noise mode in response to the second noise data exceeding the second noise threshold, the second noise mode comprises performing two or more mutual scans on a same portion of a frame.

Another general aspect includes a device that includes: a touchscreen; and a touch controller. The touch controller is configured to: perform a noise monitoring scan on the touchscreen; collect noise data from the noise monitoring scan; determine whether the noise data is greater than a first noise threshold and less than a second noise threshold or whether the noise data is greater than the second noise threshold, the second noise threshold being larger than the first noise threshold; operate in a first noise mode to apply a first noise filter in response to the noise data being greater than the first noise threshold and less than the second noise threshold; and operate in a second noise mode to apply a second noise filter in response to the noise data being greater than the second noise threshold.

Other embodiments and variations are described herein.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Touch screen devices can experience noise interference when unwanted electromagnetic signals disrupt the normal functioning of the touch screen device. Noise interference may come from various internal and external sources including, for example, a connection to a phone charger, from images on the display, nearby power lines, radio signals, fluorescent bulbs, or other electronic device. The noise interference may cause touch input processing issues, such as mistouches and ghost touches.

Known approaches for handling noise interference in touch screen devices typically implement basic filtering techniques. Conventional filtering techniques, however, may not adequately address extremely noisy environments. For example, touch controllers operating at fixed scanning frequencies may experience heavy interference when noise sources generate interference at or near those frequencies greater than the fixed scanning frequency. Thus, the noise interference can still affect touch performance even with basic filtering applied.

Additionally, existing approaches often implement the same noise countermeasures regardless of the severity of the interference, which can impact touch responsiveness more than necessary in moderate noise conditions. A one-size-fits-all approach may unnecessarily impact touch responsiveness in cases where less aggressive noise handling would suffice. The lack of adaptation based on actual noise severity can result in sub-optimal tradeoffs between noise immunity and touch performance.

Embodiments of the present disclosure provide touch screen devices that have enhanced capabilities to characterize noise conditions. Methods for maintaining touch detection reliability while managing latency and power consumption tradeoffs based on actual noise severity can help address challenges in characterizing noise conditions.

Embodiments of the present disclosure can enhance touch input processing when noise is detected by a touchscreen device. Embodiments of the present disclosure can filter out noise to improve touch response in touchscreen devices. In accordance with various embodiments, techniques and systems are provided for detecting noise and processing touch inputs on a touchscreen. Various embodiments of the present disclosure provide techniques for detecting various noise levels on a touchscreen and applying filters to reduce the impact of the noise for touch input processing.

Figure 1A:
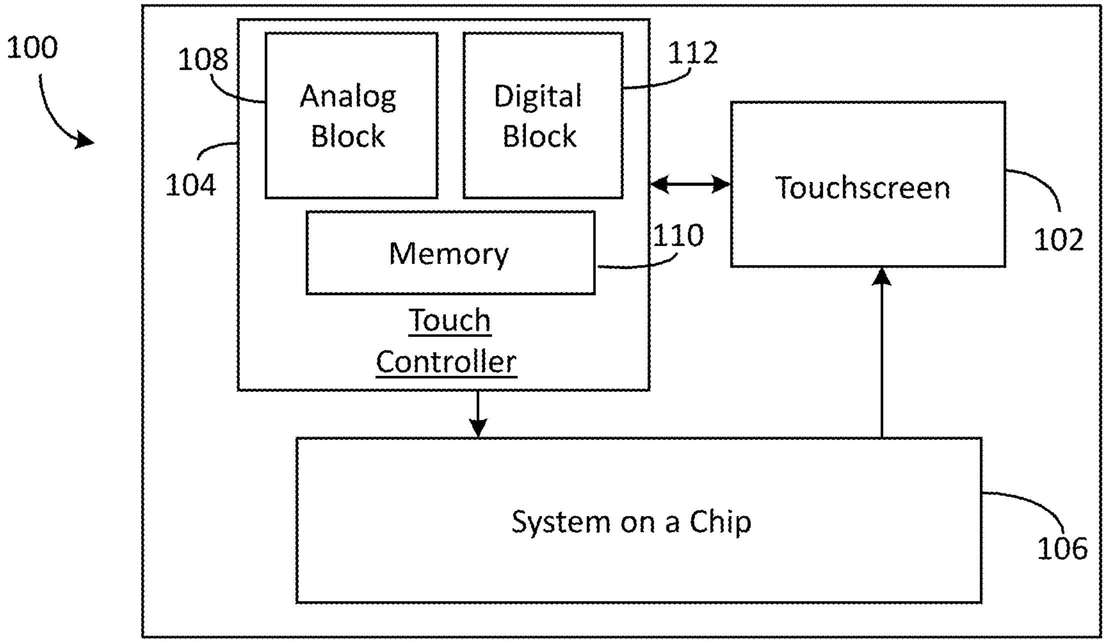
FIGS. 1A-1B illustrate a component schematic of an electronic device according to an embodiment of the present application.
Figure 1B:
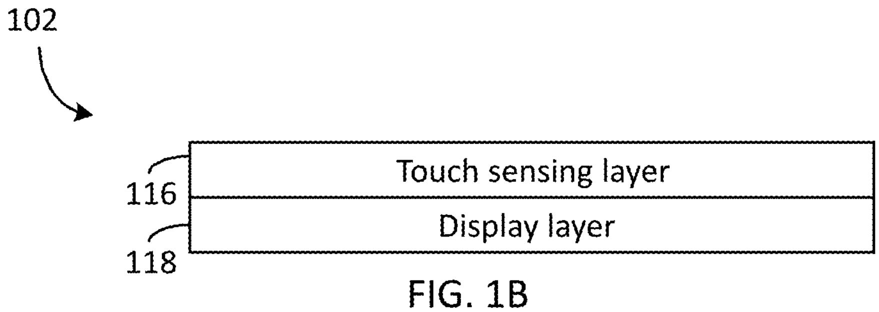

FIGS. 1A-1B illustrate a component schematic of an electronic device according to an embodiment of the present application.

Referring to FIG. 1A, an electronic device 100 may include a touchscreen 102, a touch controller 104, and a system on a chip 106. The electronic device 100 may be a smart phone, a GPS device, a tablet computer, a mobile media player, a laptop, a gaming system, a personal computer, wearable device, or any other electronic device that may utilize touch sensitive display.

While the inventive aspects are described primarily in the context of touchscreen displays in mobile devices and smartphones, it should also be appreciated that these inventive aspects may also apply to other touch-enabled electronic devices and systems. In particular, aspects of this disclosure may similarly apply to tablets, laptops, monitors, kiosks, point-of-sale terminals, automotive displays, industrial control panels, gaming devices, and other touch interface implementations.

The touchscreen 102 may be an organic light emitting diode (OLED) display, an LED display, or any other type of display. The touchscreen 102 may include a plurality of pixels in a display layer configured to display an image. As understood by those with ordinary skill in the art, the display layer of the touchscreen 102 may include of the plurality of pixels positioned at each of the intersections between the data lines and scan lines. The plurality of scan lines may extend across the rows of the touchscreen 102, and data lines that extend across the columns of the touchscreen 102 in a matrix like formation. The touchscreen 102 may also include a touch sensing layer configured to detect touch inputs made on the touchscreen 102. This will be shown in more detail below.

The touch controller 104 may perform various methods with respect to the display. In various embodiments, the touch controller 104 may be a processor that analyzes information and carries out a series of executable scripts, e.g., stored in a memory 110. In one or more embodiments, the processor may comprise an application-specific integrated circuit (ASIC) device, a central processing unit (CPU), or any other processing unit known in the art. In various embodiments, the touch controller 104 may comprise a number of separate computing units such as cores integrated within one processor, or distinct separate processing chips. Further details regarding how the touch controller 104 accounts for water on the touchscreen 102 are provided below.

In various embodiments, the touch controller 104 may include an analog block 108 and a digital block 112. The analog block 108 may include a plurality of analog circuits configured to measure capacitances across touchscreen 102 and convert them into digital values. The digital block 112 may comprise a variety of digital logic circuits such as DACs or digital control systems configured to obtain digital touch data from the analog block 108, process the digital touch data and store them into memory 110.

The memory 110 may be configured to store data and instructions for the touch controller 104 and may comprise various programs to be executed by the touch controller 104. The memory 110 may include a non-transitory computer readable medium that stores instructions for execution by the touch controller 104. The memory 110 may comprise both volatile and non-volatile components to support temporary data storage during processing and long-term storage of system software and calibration data. The volatile memory, typically RAM, provides fast access for temporary storage of sensor data, intermediate results, and current state information for a gesture recognition system. The non-volatile memory, such as Flash or EEPROM, can store information such as the device's firmware, gesture recognition algorithms, and sensor calibration data.

In various embodiments, the system on a chip 106, may also be known as an application processor, and may comprise a processor, interface, circuitry, and/or the like configured to direct the flow of input and output data to the touchscreen 102 and the associated touch controller 104. The system on a chip 106 may be configured to receive touch event data from the touch controller 104 and interpret the touch event data based on a user interface or application displayed on the touchscreen 102.

Additionally, the touch controller 104 may be configured to detect touch inputs via a touchscreen 102. In other words, the touch controller 104 may be configured to send touch driving signals (TDS) to the touchscreen, receive touch sensing signals (TSS) in return from the touchscreen, process the TSS to determine coordinates of touch, and report them to the system on a chip 106. Then based on the strength data collected from scanning, the touchscreen may be used by the touch controller 104 to determine the coordinates of touch, and report them to the system on a chip 106. Then, the system on a chip 106 may provide an output to the touchscreen 102 based on the reported coordinates of touch.

Advantageously, as will be described in more detail below, embodiments of the present application disclose a touchscreen device configured to record and analyze multiple touch inputs across a plurality of frames based on merge criteria, and a method for determining whether to merge the touch inputs for reporting. In other words, the multiple touch inputs can be merged and reported as one touch input or split and reported as separate touch inputs.

FIG. 1B illustrates a schematic of the touchscreen 102. In various embodiments, the touchscreen 102 may include a touch sensing layer 116 and a display layer 118. The touch sensing layer 116 and the display layer 118 may be situated on the front facing side of the electronic device 100. The touch sensing layer 116 is configured to detect touch inputs made on the touchscreen 102.

The touch sensing layer 116 includes a plurality of TX channels (e.g., drive channels) and RX channels (e.g., sense channels) arranged in rows and columns across the touchscreen 102. The TX channels and the RX channels form the touch sensing layer. The TX channels and RX channels may span the entirety of the touchscreen 102 in a grid-like fashion that are operable by a touch controller. In various embodiments, the TX channels may be formed in rows across the touchscreen and the RX channels 124 may be formed in columns across the touchscreen 102. In other embodiments, the RX channels 124 may be formed in rows across the touchscreen 102 and the TX channels 122 may be formed in columns across the touchscreen 102. The TX channels 122 and the RX channels 124 may overlap in certain embodiments.

The TX channels and the RX channels may be formed by electrically coupling the touchscreen 102 to rows of electrodes (e.g., TX electrodes or RX electrodes) and columns of electrodes (e.g., TX electrodes or RX electrodes) that span the entirety of the touchscreen 102. In various embodiments, the TX channels and the RX channels have a measurable mutual capacitance at their intersections. In some embodiments, the TX channels and the RX channels may have a self-capacitance that can be measured with respect to ground.

The touch controller 104 is coupled to the TX channels and the RX channels that form the touch sensing layer 116. The TX channels 122 and the RX channels 124 create a matrix of intersections that act as individual touch sensors. The touch controller 104 sends electrical signals through the TX channels and measures the changes in capacitance at each intersection point through the RX channels. The touch controller detects and locates touch events by analyzing the changes in capacitance across the touchscreen 102. The touch events may include a finger touch, stylus or pen touch, or any contact with that touchscreen 102 that changes the capacitance in the touch sensing layer 116. For convenience, these are all referred to as a touch input herein. The touch controller 104 can processes this raw data, determine the noise levels, apply noise filters corresponding to the noise levels, and interpret the touch inputs, translating them into coordinates and gestures that the device's operating system can understand. This integration between the touch controller and the touch sensing layer enables accurate and responsive touch detection.

Figure 2:
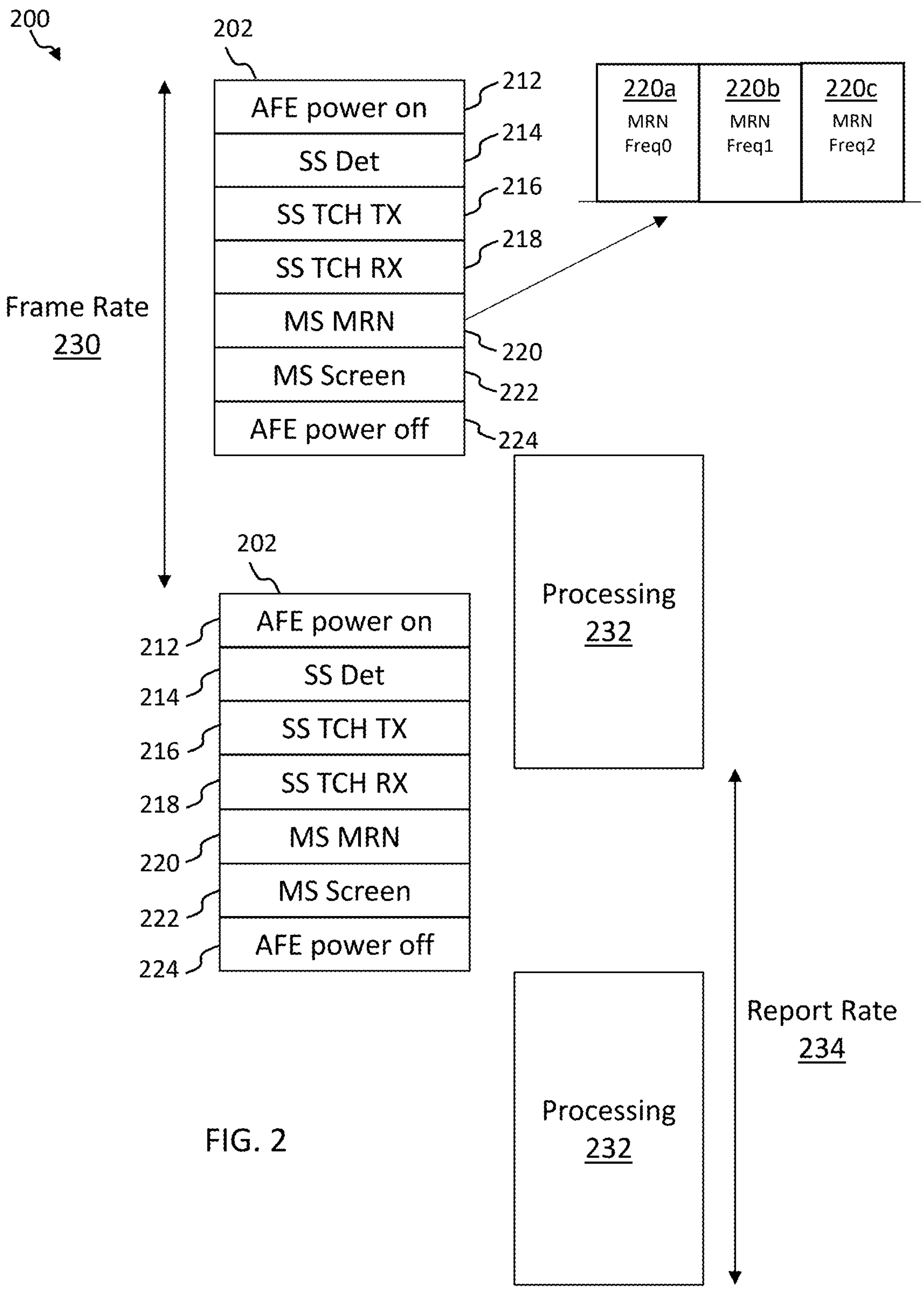
FIG. 2 illustrates a touch detection process according to an embodiment of the present application.

FIG. 2 illustrates a touch detection process according to an embodiment of the present application. The touch detection process 200 shows scanning sequences 202 and processing blocks 232. FIG. 2 will be described in conjunction with FIGS. 1A and 1B. It is understood, however, that the operations can be performed with other hardware.

In one or more embodiments, the touch controller 104 performs multiple scanning operations to detect and validate touch inputs on the electronic device 100. The touch controller 104 executes a scanning sequence 202 that includes powering on the analog front end (AFE) 212, performing self-sensing detection 214, performing self-sensing scans 216, 218, performing a noise monitoring scan 220, and performing a mutual scan 222 before powering off the AFE 224. The scanning sequence 202 can be performed for each frame to mitigate noise interference and perform touch detection. The scanning sequence 202 can be configured to balance factors such as power consumption, settling time of analog circuits, and frame timing requirements.

Each scanning sequence 202 begins with powering on the analog front end (AFE) circuit 212 (AFE power on). In various embodiments, AFE power on 212 represents an initial stage of each touch scanning frame where the analog circuitry required for touch sensing is energized and prepared for operation. The AFE contains the analog circuits used for driving signals onto the touch sensing electrodes and measuring received touch signals. During AFE power on 212, various analog components are activated in a controlled sequence. In one or more embodiments, the analog components may include drive signal generators, sensing amplifiers, analog filters, and analog-to-digital converters needed for touch detection. The AFE power on sequence ensures proper initialization of analog circuits to achieve stable operating conditions before beginning touch scanning operations.

In one or more embodiments, AFE power on 212 occurs at the start of each frame before self-sensing and mutual sensing operations can begin. In various embodiments, the timing of the AFE power on is coordinated with a frame rate 230 to maintain consistent scanning intervals. For example, at a 120 Hz frame rate, the AFE power on sequence initiates every 8.3 milliseconds to begin a new scanning frame. In other embodiments, the timing of the AFE power on may be adjusted in order to collect multiple data measurements which can alter the frame rate 230. For example, the frame rate 230 may be adjusted from 120 Hz to 90 Hz so that the duration of the AFE power on sequence changes from 8.3 ms to 11.1 ms in order to collect additional data measurements for a frame.

Following AFE power on 212, self-sensing operations may be performed. In various embodiments, self-sensing operations represent a sequence of scanning steps performed by the touch controller to detect touch inputs using self-capacitance measurements. In one or more embodiments, the self-sensing operations include initiating self-sensing detection 214 (SS Det), performing a self-sensing scan 216 on drive channels (SS TCH TX), and performing a self-sensing scan 218 on sense channels (SS TCH RX). The order of these operations are not necessarily as shown.

In one or more embodiments, the self-sensing detection 214 initiates the self-sensing sequence by preparing the touch controller 104 to measure changes in self-capacitance of individual electrodes. In various embodiments, self-sensing detection 214 includes preparing the analog circuits and digital control logic for self-capacitance measurements. Self-sensing detection 214 may also include setting up measurement parameters and reference levels used to identify potential touch activity.

In one or more embodiments, the self-sensing scan 216 on the drive channels involves driving signals onto each drive channel to enable self-capacitance measurements of the drive electrodes and ground. Similarly, the self-sensing scan on the sense channels 218 includes driving signals onto each sense channel to enable self-capacitance measurements of the sense electrodes and ground. Self-capacitance is an electrical capacitance between a single conductor and ground. In the touch sensing layer 116, the self-capacitance of a drive channel or sense channel can be measured independently of other drive and sense channels. The touch controller 104 can measure the change in self-capacitance of individual drive or sense channels. When a touch event occurs, the changes in the self-capacitance of the corresponding channel enables the detection of touch location.

In one or more embodiments, the self-sensing operations can complement the mutual scans by providing additional touch detection data using a different measurement technique. The combination of self-sensing and mutual scan measurements can help improve overall touch detection reliability, particularly in challenging noise environments.

Following the self-sensing scans 216, 218, the noise monitoring scan 220 (i.e., MS MRN) can be performed. The noise monitoring scan 220 can detect noise data on the touchscreen 102 (MS MRN). During the noise monitoring scan 220, the touch controller can set all drive channels (i.e., TX channels) to a high-impedance state or grounds them to silence the active touch sensing elements. In this state, the sense channels (i.e., RX channels) remain active but are solely "listening" to the environment. Any signals detected on the sense channels may be categorized as noise, which can originate from various sources such as images on the display, power supplies, nearby electronic devices, or chargers and USB connections.

In one or more embodiments, the noise monitoring scans 220*a*, 220*b*, 220*c* can be performed at a plurality of different frequencies Freq0, Freq1, Freq2 for each frame. For example, the different frequencies Freq0, Freq1, Freq2 may be performed at 333 kHz, at 308 kHz, and 271 kHz, respectively. The multiple frequency scanning allows the touch controller 104 to analyze noise characteristics across different operating frequencies. While this example shows three different frequencies, it is understood that two frequencies or more than three frequencies can be scanned.

In various embodiments, when noise levels are severe, the noise monitoring scan frequencies may be adjusted to avoid frequencies that may experience heavy interference. For example, if the noise levels are severe at the noise monitoring scan frequencies of 333 kHz, 308 kHz, 271 kHz, the noise monitoring scan frequencies may be adjusted to 320 kHz, 295 kHz, and 258 kHz for a subsequent noise monitoring scan.

Noise data can be collected for each of the different frequencies Freq0, Freq1, Freq2. In one or more embodiments, the touch controller 104 may create noise profiles of the noise data for each frame at each noise monitoring frequency. The noise data may include noise strength on represents an amplitude and frequency characteristics of the noise on each sense channel. The higher noise strength values may indicate greater noise interference. The noise profiles may be stored by the touch controller 104 for analysis, for example, as described below in FIG. 3.

Following the noise monitoring scan 220, the mutual scan 222 (MS Screen) can be performed. The mutual scan can be used to collect strength data on the electronic device 100. The mutual scan enables touch detection by measuring changes in the capacitive coupling between TX and RX electrodes across the entire touch sensing layer 116. When finger approaches the touchscreen 102, the electric field surrounding the sensing nodes are affected and reduces the coupling capacitance at the affected sensing nodes which can be used to determine a location or coordinates of a touch input. While the mutual scan 222 is typically performed after the noise monitoring scan 220, it is understood that the order can be reversed.

In one or more embodiments, the mutual scan involves driving the drive channels sequentially to scan the touch sensing layer 116 while the sense channels measure the signals simultaneously to collect strength data measurements in parallel. The touch controller 104 can supply drive channels on the touch sensing layer with transmission signals at specific frequencies while the sense channels receive signals coupled through the sensing nodes formed at the sensing nodes. The strength data measurements can indicate a degree of coupling at each sensing node and indicate the presence of touch inputs. The strength data measurements can be used to create a two-dimensional strength bitmap of touch activity.

In one or more embodiments, mutual scans 222 may be configured with specific scanning and processing configurations to detect touch inputs that can be adapted based on operating mode and noise conditions. The touch controller 104 may determine an optimal frequency for performing the mutual scan 222 to minimize noise interference while collecting the strength data. For example, the noise monitoring scans 220*a*, 220*b*, 220*c* can be performed at a plurality of frequencies Freq0, Freq1, Freq2, the frequency used for the noise monitoring scans 220*a*, 220*b*, 220*c* having the least noise data can be set as the frequency for the mutual scan 222. When the mutual scan frequency is set to the noise monitoring scan frequency with the lowest noise data, ghost touches or inaccurate touches can be reduced on the touchscreen 102. In various embodiments, the touch controller 104 can analyze the noise data from the noise monitoring scan 220 and the strength data measurements from the mutual scan 222 across multiple frames to distinguish sustained touch events from transient noise spikes. In one or more embodiments, the mutual scan 222 can be performed multiple times, for example, two or more, over a same portion of a frame to collect multiple strength measurements within each frame period. An average of the multiple strength data measurements can be used to determine the presence of touch inputs.

After the mutual scan 222, the scanning sequence 202 concludes by powering off the analog front end (AFE) circuit 224 (i.e., AFE power off). At the end of each frame, the AFE may be powered off to conserve power until the next frame begins. When the scanning sequence 202 is completed, the touch controller 104 begins processing 232 the noise data and strength data measurements collected from the preceding scanning sequence 202. When processing 232 is complete for the preceding scanning sequence 202, the coordinates of the touch input on the touchscreen 102 can be reported to the system on a chip 106 at a set report rate 234.

In one or more embodiments, the touch controller 104 can perform the next scanning sequence 202 while the touch controller 104 is processing 232 the preceding scanning sequence 202. The touch input may be reported to the system on a chip 106 while performing the next scanning sequence 202 and while processing 232 the next scanning sequence. The touch detection process 200 can repeat continuously for each subsequent frame.

The touch detection process 200 can be used to detect a severity of noise interference, apply appropriate noise reduction measures based on the severity, and perform touch detection based on the applied noise reduction measures. The touch detection process 200, such as the scanning frequencies in the scanning sequence 202, can be adapted to eliminate detected noise interference in touch detection.

Figure 3:
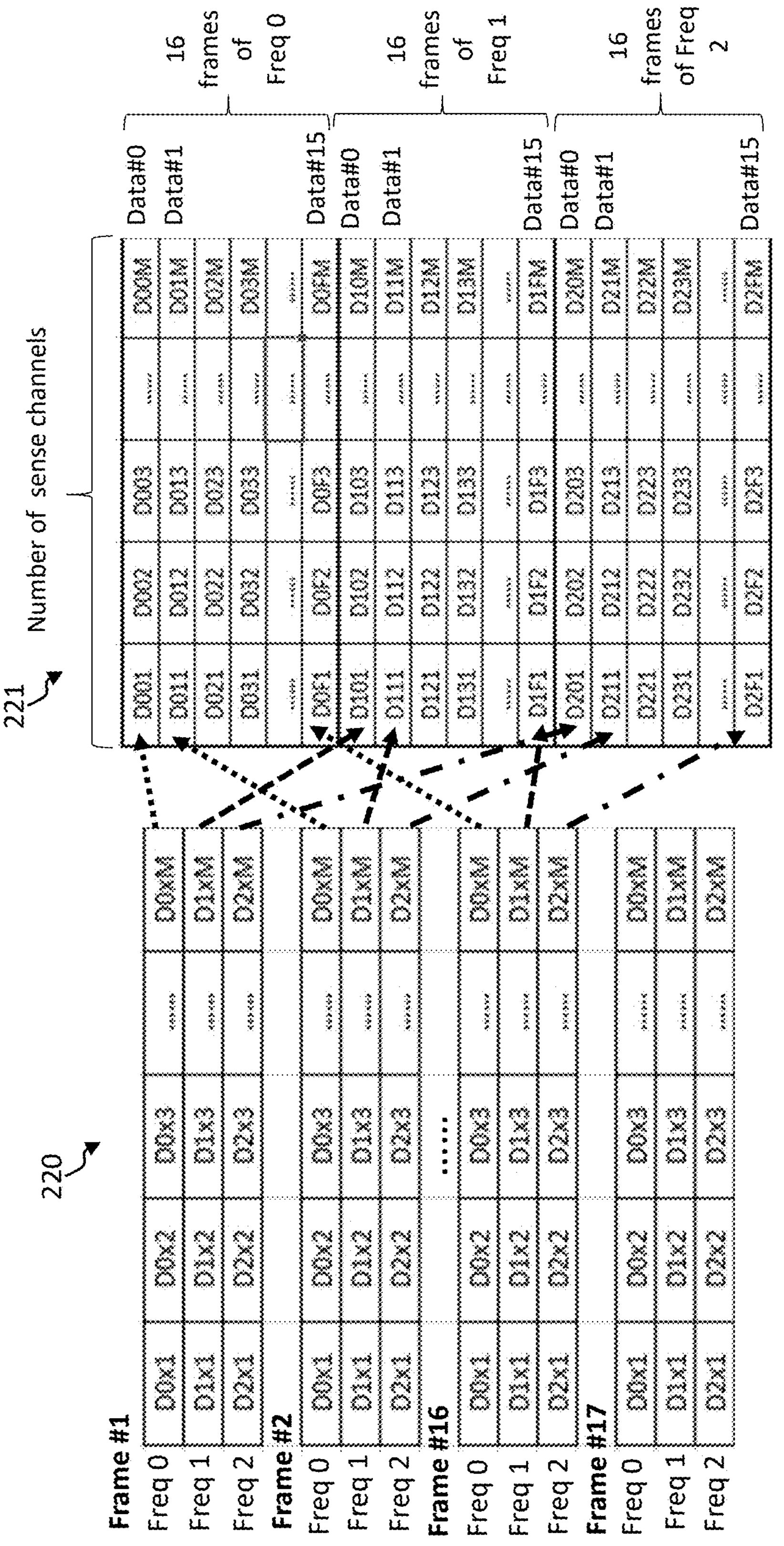
FIG. 3 illustrates noise data from a noise monitoring scan according to an embodiment of the present application.

FIG. 3 illustrates noise data from a noise monitoring scan according to an embodiment of the present application. FIG. 3 will be described in conjunction with the figures described above.

In one or more embodiments, the noise monitoring scans 220 can be performed at a plurality of different frequencies Freq0, Freq1, Freq2 for each frame as described in FIG. 2. The noise monitoring scan 220 can detect noise data for each RX channel (i.e., sense channel) at each of the plurality of frequencies Freq0, Freq1, Freq2 for multiple frames. For example, each noise monitoring scan 220 collects a noise line for the corresponding frequencies Freq0, Freq1, Freq2 for each frame. Each line or row of noise data includes noise data for M number of sense channels. For example, the noise monitoring scan 220*a* for Frame #1 at Freq0 collects a line of noise data Dox1, Dox2, Dox3, . . . , DoxM for the sense channels Rx1, Rx2, Rx3, . . . , RxM, the noise monitoring scan 220*b* for Frame #1 at Freq1 collects a line of noise data D1x1, D1x2, D1x3, . . . , D1xM for the RX channels Rx1, Rx2, Rx3, . . . , RxM, and the noise monitoring scan 220*c* for Frame #1 at Freq2 collects a line of noise data D2x1, D2x2, D2x3, . . . , D2xM for the RX channels Rx1, Rx2, Rx3, . . . , RxM.

In one or more embodiments, the touch controller 104 can store the noise data in memory 110. In one or more embodiments, the noise data collected from the noise monitoring scan 220 can be stored in a circular buffer 221. The circular buffer 221 can organize the noise data by noise monitoring scan frequency and a number of frames or samples of historical noise data measurements for the number of sense channels. As noise data from new frames are collected, the noise data can replace the oldest noise data in the circular buffer 221 and maintain a rolling window of N frames or samples of historical noise measurements for each noise monitoring scan frequency and sense channel combination.

Referring to FIG. 3, the noise monitoring scans 220 is performed at three different noise monitoring scan frequencies Freq0, Freq1, Freq2 for each frame. The noise monitoring scan 220 collects the noise data from each frame at each noise monitoring scan frequencies Freq0, Freq1, Freq2. Each cell in the circular buffer 221 stores noise data corresponding to a noise monitoring scan frequency, frame, and sense channel. For example, in the circular buffer 221, D001 represents noise data that corresponds to noise monitoring scan frequency Freq0, frame #1, and sense channel Rx1 and D112 represents noise data that corresponds to noise monitoring frequency Freq1, frame #2 and sense channel Rx2. Each line of noise data can be stored in a circular buffer 221 for each noise monitoring scan frequency by frame. For example, the first line of data stored in the circular buffer 221 corresponds to the noise monitoring scan frequency Freq0 for Frame #1, the second line of data stored corresponds to the noise monitoring scan frequency Freq0 for Frame #2, and so on. When the circular buffer 221 is full, the noise data for the newest frame, for example, Frame #17 can overwrite the stored noise data for Frame #1 in the circular buffer 221.

In various embodiments, the circular buffer 221 may maintain 16 frames or samples of historical noise data measurements for each noise monitoring scan frequency. By storing the historical noise measurements for each noise monitoring scan frequency, the touch controller 104 can perform statistical analysis of noise patterns across both time and frequency domains. For example, standard deviation calculations across the N frames or samples of noise data measurements can allow the touch controller 104 to quantify noise levels and determine appropriate noise operating modes for touch detection. The touch controller 104 can use the standard deviation calculations from the multiple sense channels and frames to determine the severity of present noise interference. Based on the standard deviation calculations, the touch controller 104 can adaptively enter different noise operating modes optimized for varying noise conditions while also maintaining touch detection reliability.

Figure 4:
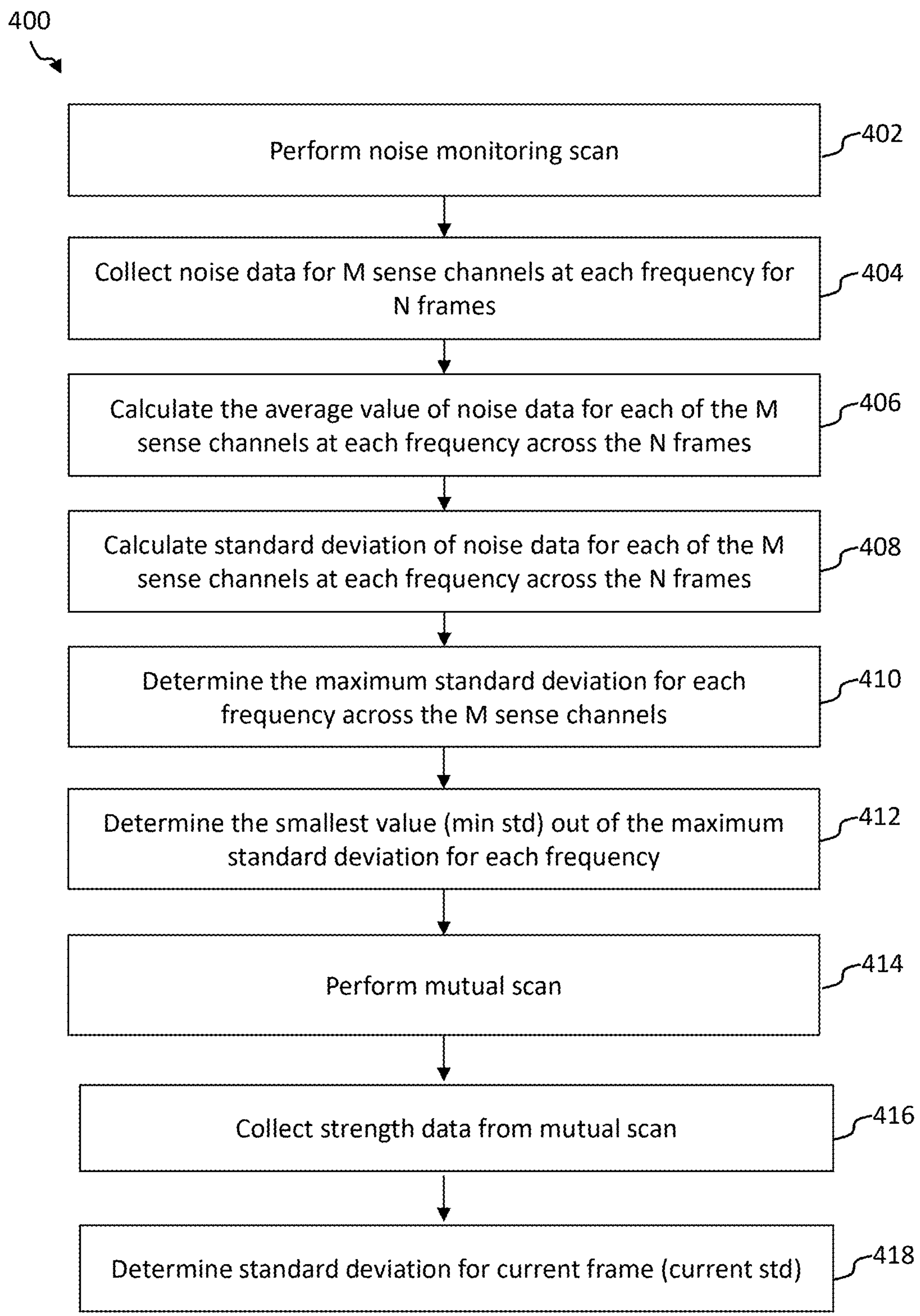
FIG. 4 illustrates a noise analysis process according to an embodiment of the present application.

FIG. 4 illustrates a noise analysis process according to an embodiment of the present application. FIG. 4 will be described in conjunction with the figures described above.

In one or more embodiments, the touch controller 104 performs the noise analysis process 400 to determine a noise operating mode for the touch detection process 200 based on the severity of noise interference. The noise analysis process 400 begins with performing a noise monitoring scan in step 402 and collecting noise data for M sense channels at each frequency for N frames in step 404 as described in FIGS. 2 and 3.

The noise analysis process 400 proceeds with step 406 to calculate an average value of the collected noise data for each of the M sense channels at each frequency Freq0, Freq1, Freq2 across the N frames. In other words, the average value of the collected noise data is an average for each sense channel for each noise monitoring scan frequency. For example, referring to FIG. 3, the average value of the noise data for sense channel Rx1 is calculated based on noise data Dox1 for 16 frames:

$$Avg_{Rx1} = \frac{\sum (D001, D011, D021, D031, \ldots, D0F1)}{16}.$$

The noise analysis process 400 proceeds with step 408 to calculate a standard deviation of the noise data for each of the M sense channels at each frequency Freq0, Freq1, Freq2 across the N frames. In other words, the standard deviation of the collected noise data is a standard deviation for each sense channel for each noise monitoring scan frequency. The standard deviation of the noise data can be calculated using the average value calculated in step 406. The standard deviation of the noise data may be calculated using the equation:

$$stddev_{fM} = \frac{1}{N}\sum_{i=1}^{N} |D_{iM} - Avg_{iM}|,$$

where f is the noise monitoring scan frequency, D is the noise data stored in the corresponding sense channel, N is a number of frames or samples, and M is the sense channel. For example, the standard deviation of the noise data for 16 frames at noise monitoring scan frequency Freq0 for sense channel R×M may be calculated using the equation:

$$stddev_{0M} = \frac{1}{16}\sum_{i=1}^{16} |D_{iM} - Avg_{iM}|.$$

The noise analysis process 400 proceeds with step 410 to determine a maximum standard deviation value for each noise monitoring scan frequency across the M sense channels. The maximum standard deviation value for each noise monitoring scan frequency may be calculated using the equation: $stddev_f = \max(stddev_{f1}, stddev_{f2}, stddev_{f3}, \ldots, stddev_{fM})$. In one or more embodiments, a maximum standard deviation value is determined for each noise monitoring scan frequency. For example, when the noise monitoring scan is performed at three different noise monitoring scan frequencies Freq0, Freq1, Freq2, a maximum standard deviation $stddev_{Freq0}$, $stddev_{Freq1}$, $stddev_{Freq2}$ is determined for each of the noise monitoring scan frequencies Freq0, Freq1, and Freq2.

The noise analysis process 400 proceeds with step 412 to determine the smallest value (i.e., min std or minimum standard deviation) out of the maximum standard deviation for each noise monitoring scan frequency. For example, the minimum standard deviation may be represented by the equation: min std=min($stddev_{Freq0}$, $stddev_{Freq1}$, $stddev_{Freq2}$). In one or more embodiments, the minimum standard deviation can be used to determine the noise monitoring scan frequency with the least noise data. The noise monitoring scan frequency with the least noise data may be set as the mutual scan frequency for the touch detection process 200.

The noise analysis process 400 proceeds with step 414 to perform a mutual scan on a current frame, step 416 to collect strength data from the mutual scan for the current frame, and step 418 to determine a standard deviation of the strength data for the current frame (i.e., current std) from the mutual scan. The standard deviation for the current frame is calculated based on the frequency set for the mutual scan frequency for the current frame. For example, the current mutual scan frequency for the current frame may be performed at the noise monitoring scan frequency with the least noise data, e.g., Freq1, then the standard deviation for the current frame may be calculated based on current std=$stddev_{freq1}$. In one or more embodiments, the standard deviation for the current frame may be used to perform noise reduction measures based on the severity of the noise interference. The severity of the noise interference may be used to determine a noise operating mode for the touch detection process 200. In one or more embodiments, the standard deviation for the current frame may be used to dynamically adjust a mutual sampling scan frequency and a hopping threshold for performing frequency hopping.

Figure 5:
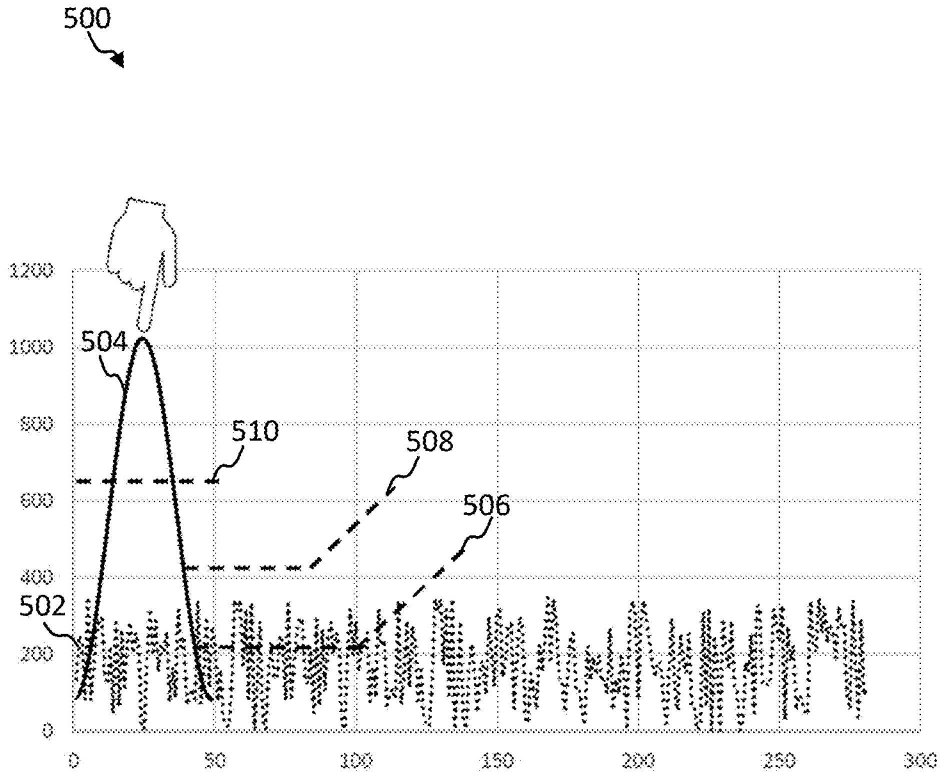
FIG. 5 illustrates an exemplary graph showing noise and touch signals according to an embodiment of the present application.

FIG. 5 illustrates an example of a graph showing noise and touch signals according to an embodiment of the present application. FIG. 5 will be described in conjunction with the figures described above.

The graph 500 shows a noise signal 502, a touch signal 504, a first noise threshold 506, a second noise threshold 508, and a touch reporting threshold 510. In one or more embodiments, the noise signal 502 represents noise interference that may be present during operation of the electronic device 100. The relative amplitude of the noise signal 502 compared to the noise thresholds 506, 508 can determine which noise operating mode is activated. When noise levels exceed certain noise thresholds, the touch controller 104 can implement certain noise filtering techniques to maintain reliable touch detection.

In various embodiments, noise interference can originate from multiple sources within and around the touchscreen device. For example, power grid noise may couple into the touchscreen 102 through power supply connections and ground references. As discussed above, phone chargers can generate significant electromagnetic interference, particularly from switching power supplies and AC-DC conversion circuits. The noise levels may vary depending on the quality of the charger, for example, inferior quality chargers can generate more severe interference. Display components can also introduce another source of noise interference. In various embodiments, the display driving signals, backlight circuits, and other display subsystems may couple electromagnetic noise into nearby touch screen devices. As display density and refresh rates increase, the potential for display-related interference may also increase.

In one or more embodiments, the noise interference can be measured by observing deviations in the capacitance values at the sensing nodes of the touch sensing layer 116. The deviations can appear as variations in signal strength measurements across different sense channels and frames. The noise signal 502 can vary in amplitude and frequency characteristics depending on the source of the noise interference and operating conditions of interfering components.

In one or more embodiments, the touch signal 504 represents a touch input on the touchscreen 102 of the electronic device 100. The touch signal 504 represents a touch input that may be from a finger touch or an active or passive pen touch. The touch controller 104 can perform touch detection by measuring signal amplitude changes at capacitive sensing nodes formed by intersecting drive and sense electrodes in the touch sensing layer 116. The changes in capacitance at the sensing nodes can indicate the presence and location of touch inputs on the touchscreen 102. When an amplitude of the touch signal 504 exceeds a touch reporting threshold 510, the touch controller 104 can process the touch signal 504 as a touch input.

In one or more embodiments, the noise signal 502 may have an amplitude that exceeds the touch reporting threshold 510. When the noise signal 502 exceeds the touch reporting threshold 510, the touch controller 104 may erroneously process the noise signal 502 as a touch input which can result in ghost touches or false touch detection. The touch controller 104 can perform touch detection in various noise operating modes that can reduce the effects of noise interference. The touch controller 104 can determine which noise operating mode to apply based on the characteristics of the noise signals 502 reduce the probability of processing the corresponding noise signals 502 as touch inputs.

In one or more embodiments, the touch controller 104 can utilize various noise thresholds to determine an appropriate noise mode for performing touch detection. For example, the touch controller 104 may include a first noise threshold 506 and a second noise threshold 508. In various embodiments, the second noise threshold 508 is a higher threshold than the first noise threshold 506. In various embodiments, the first noise threshold 506 may be referred to as a moderate noise threshold 506 and the second noise threshold 508 may be referred to as a severe noise threshold 508.

In one or more embodiments, the first noise threshold 506 may be a threshold for moderate noise and the second noise threshold 508 may be a threshold for severe noise. The first noise threshold 506 and the second noise threshold 508 may be predetermined thresholds stored in memory. For example, the first noise threshold 506 may be set to 40 and the second noise threshold 508 may be set to 80. While the noise thresholds may be described herein as a first and second noise threshold 508, it should be appreciated that the noise thresholds may include more than two noise thresholds.

In one or more embodiments, the first noise threshold 506 may be a noise threshold used to determine whether to operate in a normal mode or a first noise mode. The touch controller 104 can perform touch detection in normal mode when low noise interference is detected on the touchscreen 102 of the electronic device 100. Low noise interference is present when the amplitude of the noise signal 502 remains below the first noise threshold 506. In one or more embodiments, normal mode may rely on noise reduction techniques, such as grounding and shielding arrangements in the hardware of the electronic device 100 to minimize noise coupling into the touch sensing layer 116. While the noise reduction techniques in normal mode may be appropriate for low noise interference, the noise reduction techniques may not be sufficient for moderate or severe noise that can interfere with touch detection accuracy.

In one or more embodiments, the touch controller 104 performs touch detection in the first noise mode when moderate noise interference is detected on the touchscreen 102 of the electronic device 100. Moderate noise interference is present when the noise amplitude of the noise signal 502 exceeds the first noise threshold 506. In one or more embodiments, the first noise mode may incorporate additional noise reduction techniques, such as incorporating touch delay or increasing a touch reporting threshold to reduce the effects of moderate noise interference on the electronic device 100. While the noise reduction measures in first noise mode may be appropriate for moderate noise interference, the noise reduction measures may not be sufficient for severe noise. In various embodiments, the first noise threshold 506 may be referred to as a moderate noise threshold and the first noise mode may be referred to as a moderate noise mode.

In one or more embodiments, the touch controller 104 performs touch detection in a second noise mode when severe noise interference is detected on the touchscreen 102 of the electronic device 100. Severe noise interference is present when the noise amplitude of the noise signal 502 exceeds a second noise threshold 508. In one or more embodiments, the second noise mode may incorporate dynamic noise reduction techniques, such as firmware accumulation or frequency hopping to reduce the effects of severe noise interference on the electronic device 100. In various embodiments, the second noise threshold 508 may be referred to as a severe noise threshold and the second noise mode may be referred to as a severe noise mode.

In one or more embodiments, the touch controller 104 can dynamically switch between the noise operating modes as the characteristics of the noise signal 502 changes with each noise monitoring scan. The various noise operating modes can distinguish genuine touch events from noise-induced variations by applying a noise reduction technique that is suitable for the noise strength.

Figure 6:
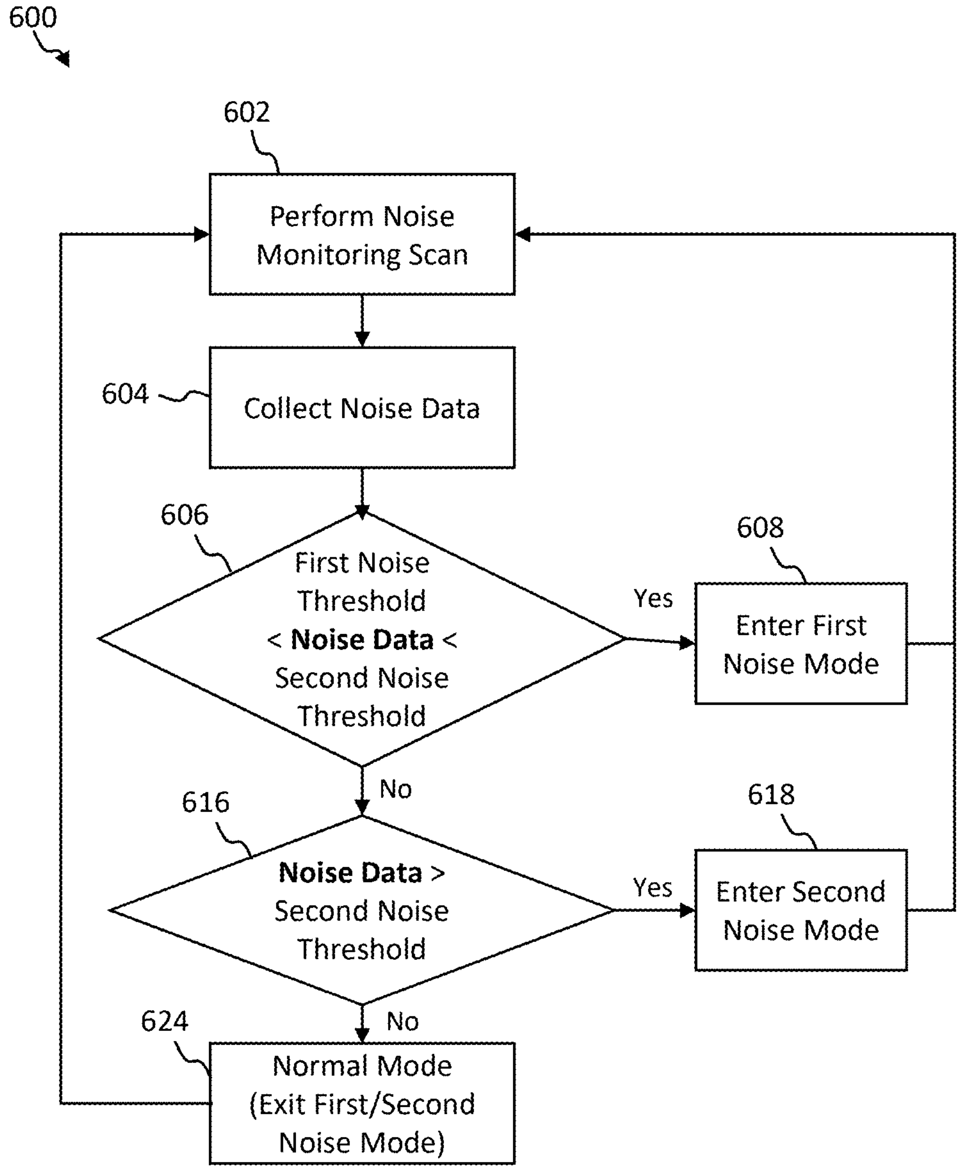
FIG. 6 illustrates a flow diagram for adaptive noise management in an electronic device according to an embodiment of the present application.

FIG. 6 illustrates a process flow for adaptive noise management in an electronic device according to an embodiment of the present application. FIG. 6 will be described in conjunction with the figures described above.

Starting at block 602, the touch controller 104 performs a noise monitoring scan on the touchscreen 102. The noise monitoring scan may be performed as described above in FIG. 2. As illustrated in the next block 604, the touch controller collects the noise data from the noise monitoring scan in block 602. In one or more embodiments, the noise data may be stored, for example, in a circular buffer. The circular buffer can store the noise data for each frequency for a number of frames for each sense channel. In various embodiments, the number of frames may represent a number of samples of the noise data for each frequency. When noise data for a new frame or sample is collected, the new noise data may overwrite the oldest data in the circular buffer and maintain a rolling window of frames or samples for each frequency and sense channel combination.

After collecting the noise data in block 604, the touch controller 104 proceeds to determine whether to perform touch detection in normal mode, a first noise mode, or a second noise mode. In normal mode, the touch controller 104 may proceed with performing touch detection without applying additional noise reduction measures. In the first noise mode, the touch controller 104 may apply a first set of noise reduction measures to reduce moderate noise levels that may interfere with touch detection. In the second noise mode, the touch controller 104 may apply a second set of noise reduction measures to reduce severe noise levels that may interfere with touch detection.

Referring to decision diamond 606, the touch controller 104 determines whether the noise data is greater than a first noise threshold 506 and less than a second noise threshold 508. In one or more embodiments, the first noise threshold 506 may be a moderate noise threshold and the second noise threshold 508 may be a severe noise threshold as described above in FIG. 5. While the noise thresholds may be described as a first noise threshold 506 and second noise threshold 508, it should be appreciated that the noise thresholds may include more than two noise thresholds.

In one or more embodiments, when the noise data is greater than the first noise threshold 506 and less than the second noise threshold 508, the touch controller 104 may determine that moderate noise interference is detected on the electronic device 100. When the noise data is greater than the first noise threshold 506 and less than the second noise threshold 508 (i.e., 606=Yes), the touch controller 104 enters a first noise mode in block 608. The first noise mode may include a first set of noise reduction measures such as adding a touch delay, by increasing a touch reporting threshold, or by incorporating an IIR (Infinite Impulse Response) filter to smooth out noise effects.

Touch delay refers to processing a detected touch input on a subsequent frame. For example, while the touch input may indicate that a touch is present on current frame N, the touch controller processes the touch input on a subsequent frame, e.g., N+1, N+2, etc.). Touch delay can improve touch detection by reporting a touch input that has be present for consecutive frames.

Touch reporting threshold refers to a strength threshold for reporting a touch input. For example, a touch input may have a strength value of 250 which can be processed as a touch when the touch reporting threshold is 200. However, when noise interference has a strength value greater than the touch reporting threshold, the noise interference may be processed as a touch input which can cause a ghost touch. By increasing the touch reporting threshold from 200, for example, to a higher touch reporting threshold of 300, noise interference below the higher touch reporting threshold is not reported as a touch input. While the first set of noise reduction measures may help with moderate noise levels, the methods may not fully omit severe noise interference.

In one or more embodiments, when the noise data is not greater than the first noise threshold 506 and less than the second noise threshold 508 (i.e., 606=No), the touch controller 104 determines whether the noise data is greater than the second noise threshold 508 in decision diamond 816. In one or more embodiments, when the noise data is greater than the second noise threshold 508, the touch controller 104 may determine that severe noise interference is detected on the electronic device 100. When the noise data is greater than the second noise threshold 508 (i.e., 608=Yes), the touch controller enters a second noise mode in block 618. The second noise mode may apply a second set of noise reduction measures such as firmware accumulation and frequency hopping.

Firmware accumulation refers to performing two or more mutual scans to collect multiple touch strength measurements within a frame period. Firmware accumulation will be described in detail below. Frequency hopping refers to adapting the scanning frequency for the mutual scan based on the frequency of the noise monitoring scan. By performing frequency hopping, noise levels that are typically be close to the scanning frequency for the mutual scan can be dynamically adjusted to eliminate noise that may interfere with touch detection. Frequency hopping will be described in detail below. In one or more embodiments, firmware accumulation or frequency hopping may be implemented in the second noise mode. In other embodiments, firmware accumulation and frequency hopping may be implemented together in the second noise mode. In some embodiments, frequency hopping may be performed before firmware accumulation so that the two or more mutual scans are performed at the adjusted scanning frequency.

When the noise data is not greater than the second noise threshold 508, the process proceeds to normal mode in block 624. In one or more embodiments, the touch controller 104 may exit the first noise mode 608 or second noise mode 618 depending on the previous operating state. After entering the first or second noise mode or returning to normal mode, the process loops back to performing noise monitoring scan in block 602. The touch controller 104 continuously monitors the noise data and adapts to the noise interference to improve touch detection. The continuous monitoring of noise strength allows the touch controller to dynamically adjust its operation based on the noise interference.

Figure 7:
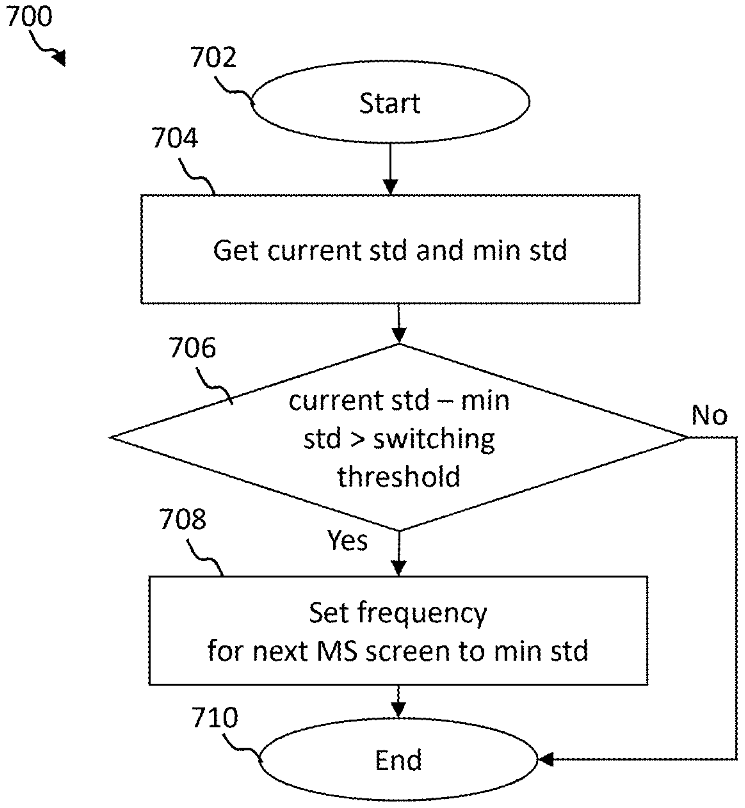
FIG. 7 illustrates a flow diagram for determining a mutual scan frequency for touch detection according to an embodiment of the present application.

FIG. 7 illustrates a flow diagram for performing frequency hopping according to an embodiment of the present application. FIG. 7 will be described in conjunction with the figures described above.

In one or more embodiments, frequency hopping can be performed to dynamically adjust the mutual scan frequency in order to eliminate noise that may interfere with touch detection. In one or more embodiments, the standard deviation of strength data for the current frame (current std) and the minimum standard deviation (min std) from the noise analysis process 400 can be used to determine whether to adjust the mutual scan frequency for touch detection. The touch controller 104 can determine an optimal frequency for performing subsequent mutual scans 222 to minimize noise interference while collecting the strength data. The touch controller 104 can adjust the mutual scan frequency to the optimal frequency for subsequent mutual scans 222.

Referring to FIG. 7, the flow diagram 700 begins at start 702 and proceeds to get the standard deviation for the current frame (current std) and the minimum standard deviation (min std) in block 704 from the noise analysis process 400. The standard deviation for the current frame and the minimum standard deviation can be compared to a hopping threshold.

At decision block 706, the touch controller 104 calculates a difference between the standard deviation for the current frame (current std) and the minimum standard deviation (min std) and compares the standard deviation difference with the hopping threshold. The comparison determines whether the current mutual scan frequency is experiencing significant noise interference compared to the noise monitoring scan frequency having the least noise data. In various embodiments, the standard deviation calculations for the current frame may be performed on data measurements collected on the current frame for the current mutual scan frequency as described in the standard deviation calculations of FIG. 4.

For example, when the standard deviation difference is greater than the hopping threshold, the current mutual scan frequency is experiencing significant noise interference compared to the noise monitoring scan frequency having the least noise data. When the standard deviation difference is less than the hopping threshold, the current mutual scan frequency is experiencing less noise interference compared to the noise monitoring scan frequency having the least noise data. When the standard deviation difference exceeds the hopping threshold (i.e., 706=Yes), the process moves to block 708. At block 708, the touch controller 104 sets the mutual scan frequency for the next mutual scan to the noise monitoring scan frequency having the least noise data. By adjusting the mutual scan frequency, the mutual scan can avoid heavy noise interference when performing touch detection. In various embodiments, the new mutual scan frequency can be maintained until noise conditions change.

When the standard deviation difference does not exceed the threshold at decision block 704 (i.e., 704=No), the process flow 700 proceeds ends at block 708, maintaining the current mutual scan frequency. The flow diagram 700 can repeat continuously during device operation to dynamically adjust the mutual scan frequency for mutual scans based on the noise conditions in the preceding noise monitoring scans. This adaptive frequency determination helps maintain reliable touch detection by avoiding frequencies most affected by noise interference.

Figure 8:
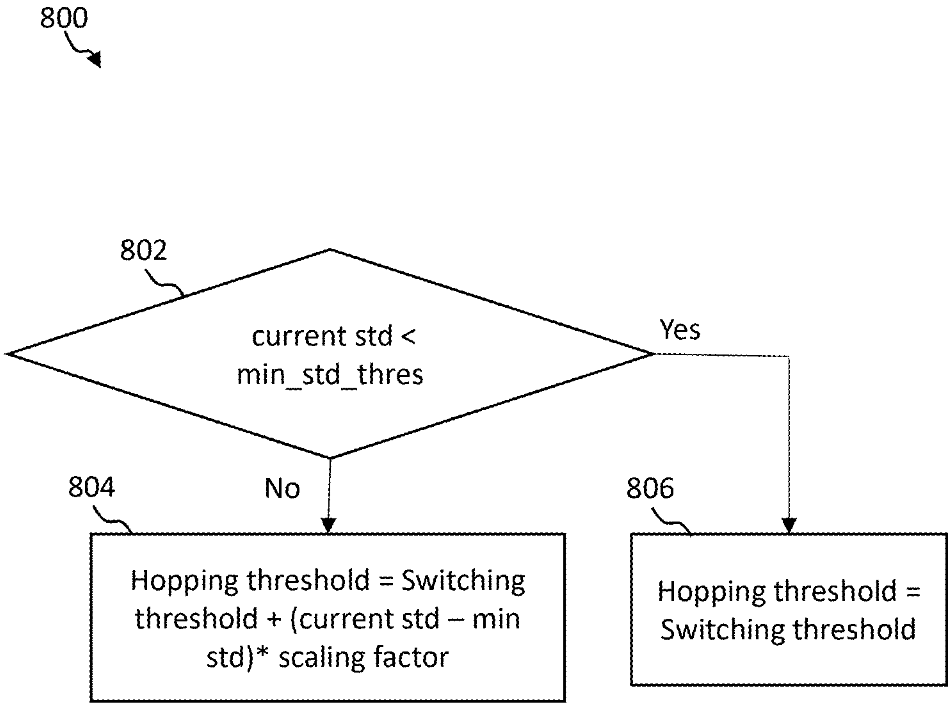
FIG. 8 illustrates a flow diagram for adaptive noise management in an electronic device according to an embodiment of the present application.

FIG. 8 illustrates a process flow for adaptive noise management in an electronic device according to an embodiment of the present application. FIG. 8 will be described in conjunction with the figures described above.

In one or more embodiments, the hopping threshold can be dynamically adjusted based on the standard deviation of strength data for the current frame (current std) from the noise analysis process 400 and a minimum standard deviation threshold (min_std_threshold). The flow diagram 800 shows a process for dynamically adjusting a hopping threshold. In one or more embodiments, the touch controller 104 can evaluate the noise conditions and adjust the hopping threshold based on the noise conditions.

In one or more embodiments, the standard deviation for the current frame from the noise analysis process 400 can be used to determine the hopping threshold for determining the mutual scan frequency for touch detection in flow diagram 700 the.

At decision block 802, the touch controller 104 compares the standard deviation for the current frame with a minimum standard deviation threshold (min_std_thres). The minimum standard deviation threshold may be a predetermined value, for example, a value of 30, that can be stored in memory 110 of the touch controller 104. This comparison can determine whether the current noise conditions warrant an adjustment of the hopping threshold. In various embodiments, the standard deviation calculations may be performed on data measurements collected across multiple frames for each scanning frequency as described in FIG. 4.

In one or more embodiments, the hopping threshold may be dynamically adjusted to a higher threshold that is adapted to the current noise conditions. When the current standard deviation exceeds the minimum standard deviation threshold, the process moves to block 804. At block 804, the touch controller 104 adjust the hopping threshold based on a predetermined switching threshold, the standard deviation for the current frame (current std), the minimum standard deviation (min std), and a predetermined scaling factor. The switching threshold and the scaling factor may be predetermined values stored in memory 110. The switching threshold may be a value of 15, and the scaling factor may be ¼, for example. The noise threshold may be adjusted based on the formula: Hopping threshold=Switching threshold+(current std-min std)*(scaling factor). By adjusting the hopping threshold to a higher threshold, the touch controller 104 can evaluate touch detection when the current noise conditions indicate severe noise interference.

When the current standard deviation is less than the minimum standard deviation threshold at decision block 802, the process proceeds to block 806. At block 806, the hopping threshold is set equal to the switching threshold. The switching threshold may be a threshold value of 15. In various embodiments, the hopping-threshold adjustment process can repeat continuously during device operation to maintain appropriate noise detection thresholds as noise conditions change.

Figure 9A:
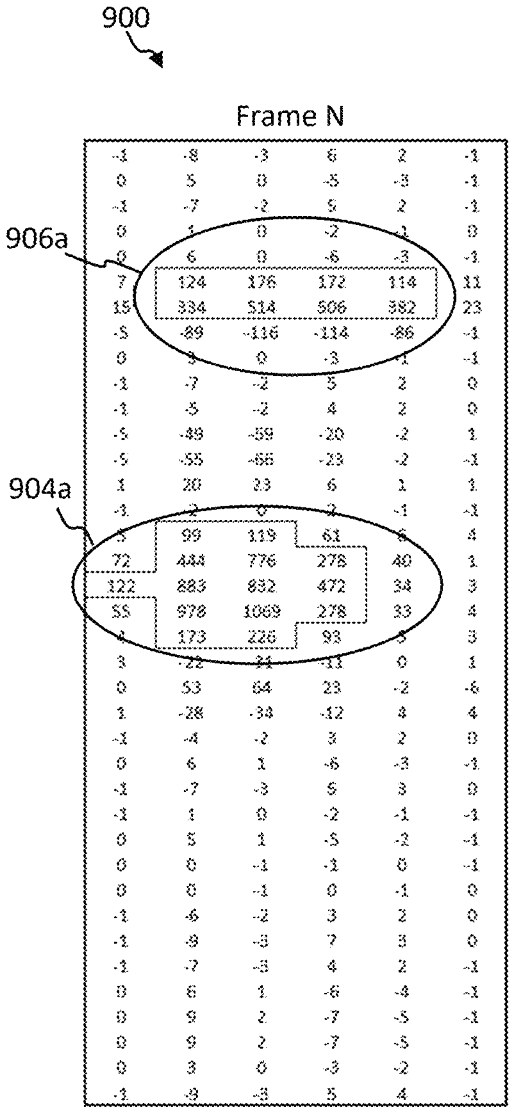
FIGS. 9A and 9B illustrate strength bitmaps according to an embodiment of the present application.
Figure 9B:
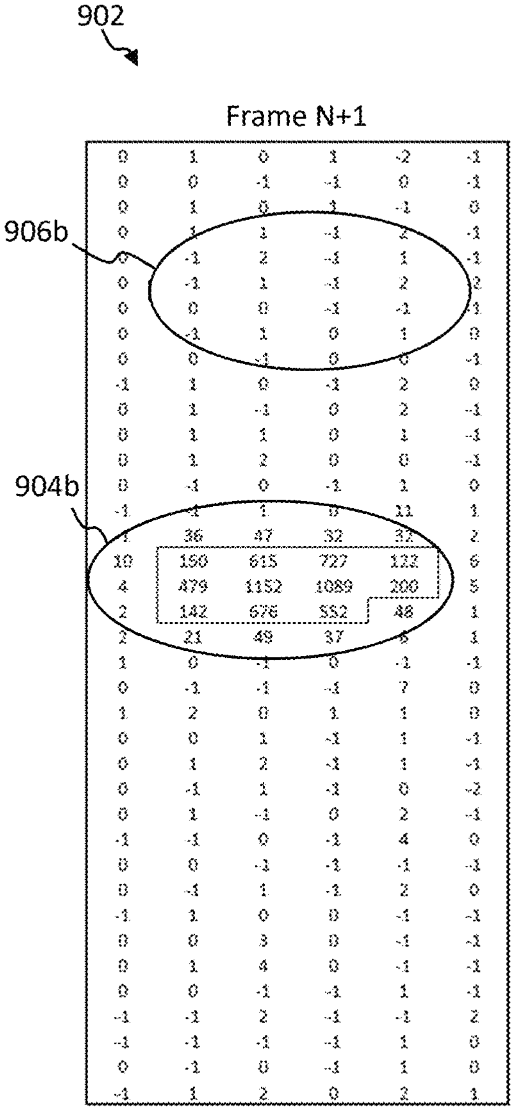

FIGS. 9A and 9B illustrate strength bitmaps according to an embodiment of the present application. FIGS. 9A-9B will be described in conjunction with FIGS. 1A and 1B. FIG. 9A shows a strength bitmap 900 for frame N that represent changes in capacitance on the electronic device 100. FIG. 9B shows a strength bitmap 902 for frame N+1 that represent changes in capacitance on the electronic device 100. The strength bitmaps 900, 902 can used to illustrate noise reduction techniques that can improve touch detection accuracy by reporting a touch event when changes in capacitance indicate a touch input and ignoring (e.g., not reporting) changes in capacitance that indicate noise interference.

In one or more embodiments, the touch controller 104 generates the strength bitmaps 900, 902 that includes strength values representing the changes in capacitance for each frame (e.g., N, N+1, etc.). Each frame of the strength bitmap 900, 902 provides a snapshot of the sensing nodes and the corresponding strength values can be recorded and analyzed across consecutive frames to determine which sensing nodes may indicate a touch input or noise interference.

In one or more embodiments, the strength values may include both positive and negative values. Positive strength values may represent an increase in capacitance which could be caused, for example, by a finger or stylus. Negative strength values may represent a decrease in capacitance, which can occur around the edges of a touch event or due to environmental factors. The magnitude of these strength values correlates with a strength of a touch input or noise interference. Larger positive strength values indicate a stronger touch or more significant presence of a conductive object. The strength bitmaps may display the data output for the strength values in grayscale or in color to represent touch intensity.

In one or more embodiments, the touch controller 104 may be configured to adjust a touch reporting threshold as a noise reduction technique. The touch reporting threshold can be used to determine when a touch input is present. When the strength values of the sensing nodes exceed the touch reporting threshold, the touch controller 104 determines that a touch input is present at the respective sensing nodes and can be reported as a touch event. When the strength values of the sensing nodes are less than the touch reporting threshold, the touch controller 104 can ignore the respective sensing nodes.

In one or more embodiments, the touch reporting threshold may be set to a value above an amplitude of a noise signal that can interfere with touch detection. For example, when the amplitude of a noise signal is 250, the touch reporting threshold may be set to +800. In various embodiments, the touch reporting threshold can be adjusted or increased when moderate or severe noise is present. By increasing the touch reporting threshold, moderate or severe noise that would otherwise exceed the set touch reporting threshold can be omitted by the adjusted touch reporting threshold. The touch reporting threshold may vary for different, noise levels, devices, or projects that require different touch strengths. For example, the touch reporting thresholds may be 150, 200, 250, etc. In various embodiments, adjusting a touch reporting threshold may be incorporated in a moderate noise mode when moderate noise interference is present.

In one or more embodiments, the touch controller 104 can store the strength bitmaps in memory 110 for multiple consecutive frames to enable analysis of overlapping touch patterns across the frames to determine a location of a touch input. The touch controller 104 can use the strength bitmaps to determine the presence of a touch input when the strength values exceeds the touch reporting threshold and report the touch input as a touch event to the system on a chip 106.

As shown in FIGS. 9A and 9B, the strength bitmap 900 includes strength values of a touch input 904*a* and noise interference 906*a* for frame N, and the strength bitmap 902 includes strength values of a touch input 904*b* and noise interference 906*b* for frame N+1. The touch input 904*a* in frame N and the touch input 904*b* in frame N+1 are shown on sensing nodes that overlap on consecutive frames N and N+1. The noise interference 906*a* on frame N and the noise interference 906*b* on frame N+1 are shown on different sensing nodes between consecutive frames N and N+1. While some noise interference 906*a* may cause the sensing nodes to have strength values that exceed a touch reporting threshold, a touch delay can be incorporated to further improve touch detection accuracy.

In one or more embodiments, the touch controller 104 may be configured to incorporate a touch delay as a noise reduction technique. The changes in capacitance for touch inputs are typically detected on sensing nodes that overlap for consecutive frames. The changes in capacitance for noise interference, on the other hand, does not typically overlap between consecutive frames. In various embodiments, touch delay may be incorporated in a moderate noise mode when moderate noise interference is present.

Touch delay can be performed by analyzing the strength bitmaps 900, 902 for multiple consecutive frames. When changes in capacitance on the sensing nodes overlap for multiple consecutive frames, the touch controller 104 can determine that a touch input is present at the overlapping sensing nodes and the touch input can be reported as a touch event. For example, the touch controller 104 can determine that the changes in capacitance on the sensing nodes is a touch input when the changes in capacitance on the sensing nodes are observed on multiple frames (e.g., frame N, N+1, or N+n). While the touch input may be detected on a first frame N, with touch delay, the touch controller 104 reports the touch input as a touch event when the touch input is detected on a later frame (e.g., N+1, N+2, or N+n). The touch controller 104 may be configured to report the touch event at a specific frame, for example, N+1. The specific frame used for reporting a touch event can vary for different devices or projects.

Figure 10A:
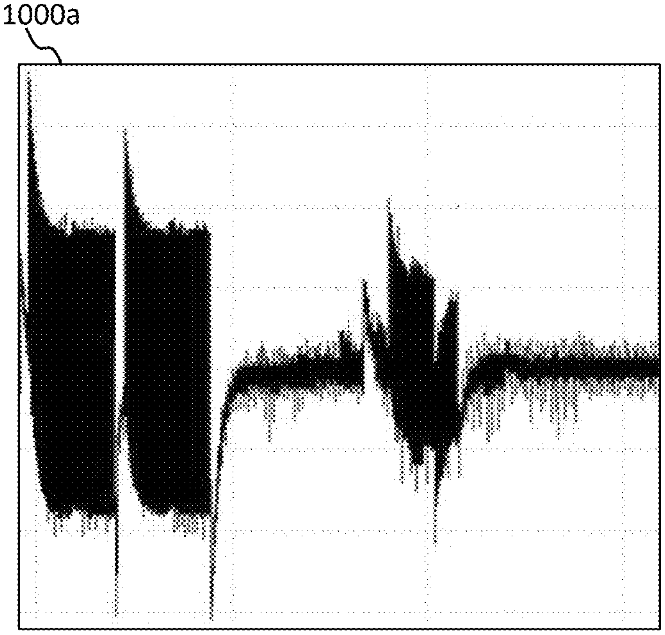
FIGS. 10A and 10B illustrate output signals according to an embodiment of the present application.
Figure 10B:
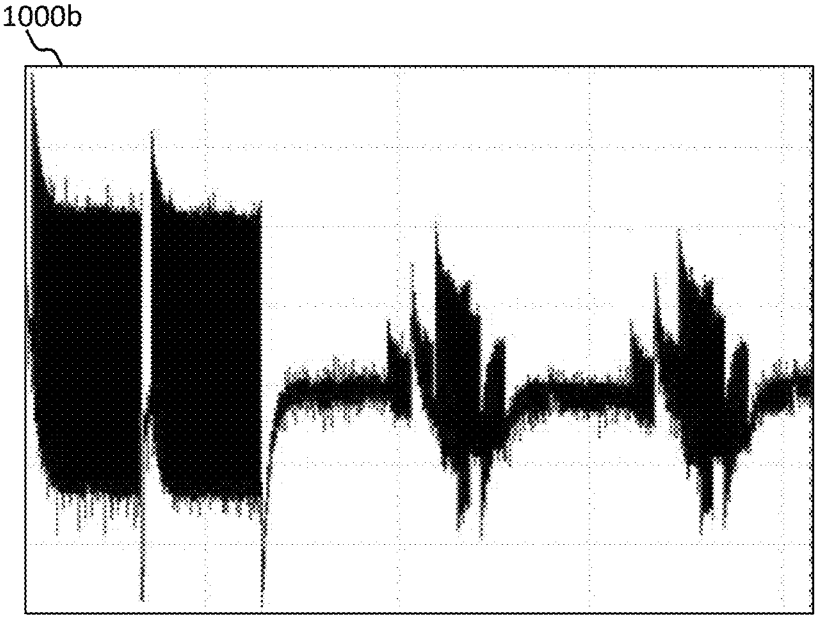

FIGS. 10A and 10B illustrate output signals according to an embodiment of the present application. FIGS. 10A and 10B will be described in conjunction with the figures described above. FIGS. 10A and 10B show exemplary output signals 1000*a*, 1000*b* mutual scans with different scanning configurations.

FIG. 10A shows an exemplary output signal 1000*a* for one frame period of a mutual scan. The output signal 1000*a* shows a strength data measurement collected from the mutual scan. In one or more embodiments, the touch controller 104 can perform a mutual scan to collect a single strength data measurement for each frame period. When low or moderate noise interference is present, one strength data measurement for each frame may be sufficient for accurate touch detection. When noise interference is severe, a single strength data measurement for each frame may not provide accurate touch detection. For example, the touch controller 104 may process a false touch or mask actual touches if a single strength data measurement coincides with a noise spike. By collecting multiple strength data measurements for each frame, or enabling firmware accumulation, noise spikes in severe noise interference can be omitted during touch detection.

FIG. 10B shows an exemplary output signal 1000*b* for one frame period of a mutual scan with firmware accumulation enabled. When firmware accumulation is enabled, the touch controller 104 performs two or more mutual scans over a same portion of a frame to collect multiple strength measurements within each frame period. For example, the output signal 1000*b* shows two strength data measurements collected during one frame period. While the output signal 1000*b* shows two strength measurements, the touch controller 104 can be configured to perform any number of mutual scans within each frame period to collect any number of strength data measurements in each frame, for example, three, four, or more strength data measurements.

In one or more embodiments, firmware accumulation can provide a more robust touch detection in environments with severe noise interference. Firmware accumulation provides enhanced noise immunity by collecting and averaging multiple strength measurements within each frame period. When compared to a single strength measurement, the average of multiple strength measurements can reduce the impact of random noise fluctuations and transient interference. Since random noise typically varies between measurements and valid touch signals remain relatively stable, the average of multiple strength data measurements can improve the signal-to-noise ratio of the touch measurements. For example, noise interference from power supplies, chargers, or display components can generate periodic noise patterns causing random noise spikes. By collecting and averaging multiple measurements, the impact of individual random noise spikes can be reduced which leads to more reliable touch detection.

In various embodiments, the multiple strength data measurements per frame also enables additional noise analysis. The variations between multiple strength data measurements within a frame can also provide information about noise characteristics to improve touch detection. Statistical analysis of the multiple strength data measurements can identify and compensate for different types of interference patterns, further improving touch detection reliability in noisy environments.

In one or more embodiments, strength data measurements may be collected at different frame rates depending on the scanning configuration of the mutual scan. For example, a mutual scan configured to collect one strength measurement per frame may be processed at a frame rate of 120 Hz. A mutual scan configured to collect multiple strength measurements, when firmware accumulation is enabled, may be processed at a lower frame rate and require more scanning time. For example, a mutual scan configured to collect two strength data measurements may reduce the frame rate from 120 Hz to 90 Hz. In one or more embodiments, each additional strength data measurement may further reduce the frame rate. While firmware accumulation requires additional scanning time and reduces the frame rate, the trade-off between response speed and noise reduction can be worthwhile in noisy environments.

In one or more embodiments, the touch controller 104 can dynamically enable or disable firmware accumulation based on detected noise conditions. By enabling and disabling firmware accumulation based on the noise condition, the touch controller 104 can provide enhanced noise reduction when noise interference is severe and maintain processing speed when noise interference is low or moderate.

Figure 11:
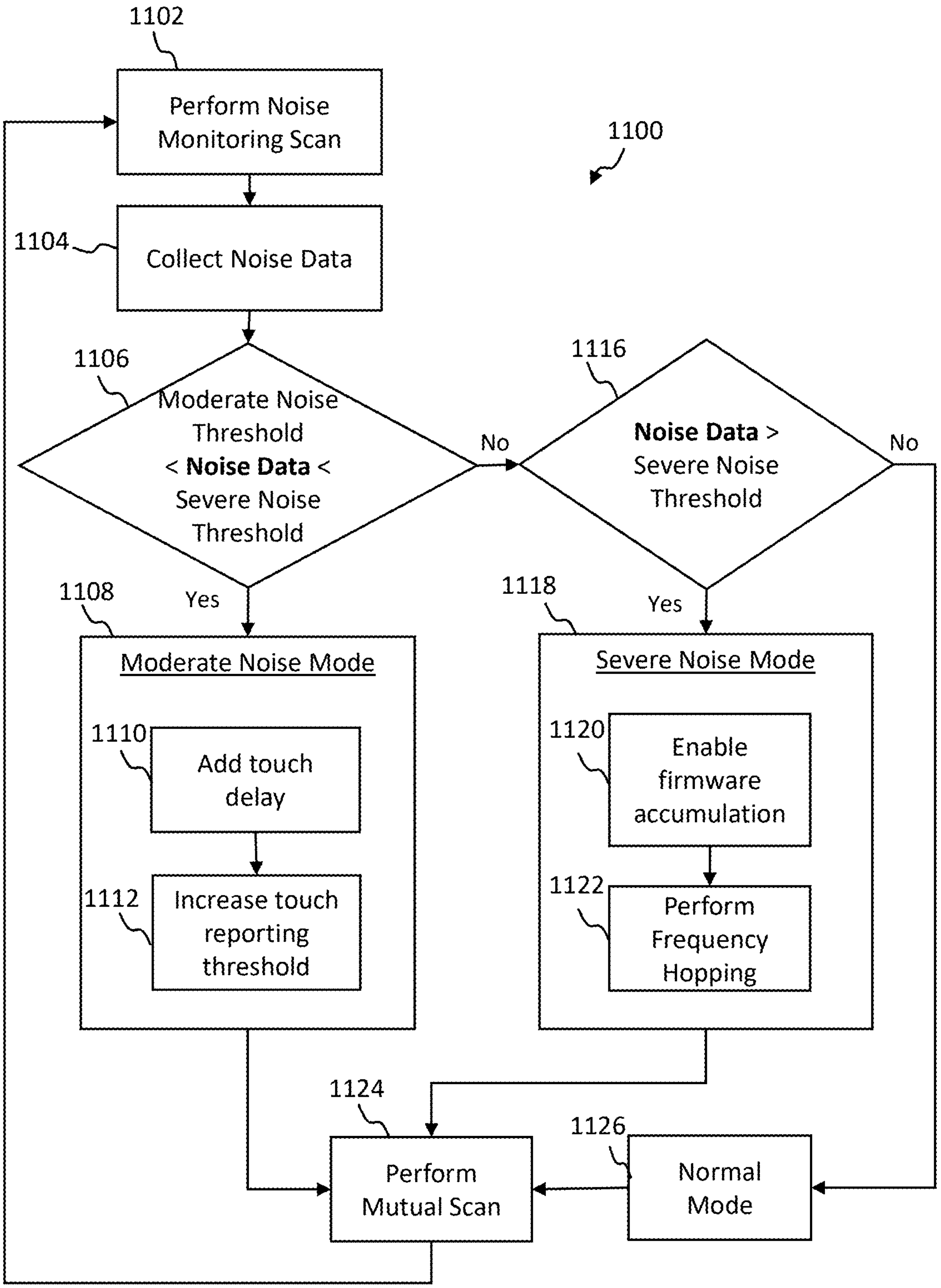
FIG. 11 illustrates a flow diagram for adaptive noise management in an electronic device according to an embodiment of the present application.

FIG. 11 illustrates a process flow for adaptive noise management in an electronic device according to an embodiment of the present application. FIG. 11 will be described in conjunction with the figures described above.

The process flow 1100 begins with performing a noise monitoring scan in block 1102 and collects the noise data in block 1104 from the noise monitoring scan. The noise monitoring scan in block 1102 corresponds to the noise monitoring scan as described above for block 602 of FIG. 6, and the noise data collection 1104 corresponds to noise data collection as described above for block 604 of FIG. 6.

In one or more embodiments, the noise data may be stored, for example, in a circular buffer. The circular buffer can store the noise data for each frequency for a number of frames for each sense channel. In various embodiments, the number of frames may represent a number of samples of the noise data for each frequency. When noise data for a new frame or sample is collected, the new noise data may overwrite the oldest data in the circular buffer and maintain a rolling window of frames or samples for each frequency and sense channel combination.

After collecting the noise data in block 1104, the touch controller 104 proceeds to determine whether to perform touch detection in normal mode 1126, a moderate noise mode 1108, or a severe noise mode 1118. In one or more embodiments, the touch controller 104 proceeds with performing touch detection without applying additional noise reduction measures in normal mode 1126. The touch controller 104 can apply a first set of noise filters to reduce moderate noise levels that may interfere with touch detection in moderate noise mode 1108. The touch controller 104 applies a second set of noise filters to reduce severe noise levels that may interfere with touch detection in severe noise mode 1118.

Referring to decision diamond 1106, the touch controller 104 determines whether the noise data is greater than a moderate noise threshold 506 and less than a severe noise threshold 508 as described above in FIG. 6. In one or more embodiments, when the noise data is greater than the moderate noise threshold 506 and less than the severe noise threshold 508, the touch controller 104 determines that moderate noise interference is detected on the electronic device 100. When the noise data is greater than the moderate noise threshold 506 and less than the severe noise threshold 508 (i.e., 1106=Yes), the touch controller 104 enters moderate noise mode 1108. In one or more embodiments, the moderate noise mode 1108 includes a first set of noise reduction measures that includes adding a touch delay 1110 to validate touches across multiple frames and increasing the touch reporting threshold 1112 to distinguish valid touches from noise, as described above in FIGS. 9A and 9B.

In one or more embodiments, the moderate noise threshold 506 may be a predetermined first noise threshold and the severe noise threshold 508 may be a predetermined second noise threshold. The predetermined first noise threshold is less than the predetermined second noise threshold. For example, the moderate noise threshold 506 may be set to 40 and the severe noise threshold 508 may be set to 80. While the noise thresholds may be described herein as a moderate or first noise threshold 506 and severe or second noise threshold 508, it should be appreciated that the noise thresholds may include more than two noise thresholds.

When the noise data is not greater than the moderate noise threshold 506 and less than the severe noise threshold 508 (i.e., 1106=No), the touch controller 104 determines whether the noise data is greater than the severe noise threshold 508 in decision diamond 1116. In one or more embodiments, when the noise data is greater than the severe noise threshold 508, the touch controller 104 determines that severe noise interference is detected on the electronic device 100. When the noise data is greater than the severe noise threshold 508 (i.e., 1116=Yes), the touch controller enters severe noise mode 1118. In one or more embodiments, the severe noise mode 1118 includes a second set of noise reduction measures that includes firmware accumulation 1120 as described above in FIGS. 10A and 10B and frequency hopping 1122 as described above in FIG. 7.

When the noise data is not greater than the severe noise threshold 508 (i.e., 1116=No), the process proceeds to normal mode 1126 to perform touch detection. In one or more embodiments, the touch controller 104 may exits the moderate noise threshold 506 or severe noise threshold 508 depending on the previous operating state.

From normal mode 1126, moderate noise mode 1108, and severe noise mode 1118, the process proceeds to perform a mutual scan. The mutual scan collects touch strength data from the touch sensing layer 116 based on the noise reduction measures applied in the corresponding noise mode. For example, when operating in normal mode 1126, the mutual scan collects one strength measurement per frame at a 120 Hz frame rate and the touch controller 104 processes the single touch strength data to determine the coordinates of the touch input. When operating in moderate noise mode 1108, for example, the touch controller 104 adds a touch delay 1110 to process the detected touch input on a later frame and increases the touch reporting threshold 1112 to a threshold higher than the collected noise data from block 1104. When operating in severe noise mode 1118, for example, the touch controller 104 enables firmware accumulation 1120 to collect and average multiple strength data measurements from the mutual scan and performs frequency hopping 1122 by change the scanning frequency for the mutual scan based on the frequency of the noise monitoring scan.

The touch controller 104 can process the touch strength data from the mutual scan to determine the coordinates of touch on the touchscreen and report the touch to the system on a chip 106. The system on a chip 106 can provide an output to the touchscreen 102 based on the reported coordinates of touch.

After the mutual scan in block 1124, the process 1100 returns to block 1102 to perform noise monitoring scan. The process maintains a continuous loop, returning to perform noise monitoring scan 1102 to adapt to changing noise conditions. In one or more embodiments, the touch controller 104 can continuously monitor noise data and adapt to the noise interference to improve touch detection. The continuous monitoring of noise data allows the touch controller 104 to dynamically adjust its operation based on the severity of the noise interference. This adaptive approach allows the touch controller to maintain reliable operation across varying levels of environmental interference.

Example embodiments of the present application are summarized here. Other embodiments can also be understood from the entirety of the specification and the claims filed herein.

Example 1. A first example includes a method of operating a touchscreen device. The method includes: performing a noise monitoring scan on the touchscreen device; collecting noise data from the noise monitoring scan; determining whether the noise data is greater than a first noise threshold and less than a second noise threshold and, if so, whether the noise data is greater than the second noise threshold, the second noise threshold being larger than the first noise threshold; entering a first noise mode to apply a first noise filter in response to the noise data being greater than the first noise threshold and less than the second noise threshold; and entering a second noise mode to apply a second noise filter in response to the noise data being greater than the second noise threshold.

Example 2. The method of example 1, where applying the first noise filter includes: adding a touch delay so that reporting touch inputs are delayed by a number of frames; increasing a touch reporting threshold; and reporting a touch input based on the added touch delay and the increased touch reporting threshold.

Example 3. The method of one of examples 1 or 2, where applying the second noise filter includes: performing two or more mutual scans on a same portion of a frame on the touchscreen device; collecting strength data from each of the two or more mutual scans; calculating an average strength of the strength data from the two or more mutual scans; and reporting a touch input in response to the calculated average strength exceeding a touch reporting threshold.

Example 4. The method of any one of examples 1 to 3, where applying the second noise filter includes: setting a mutual scan frequency for subsequent mutual scans based on the noise data from the noise monitoring scan; performing two or more mutual scans on a same portion of a frame at the mutual scan frequency based on the noise data; collecting strength data from each of the two or more mutual scans; calculating an average strength of the strength data from the two or more mutual scans; and reporting a touch input in response to the calculated average strength exceeding a touch reporting threshold.

Example 5. The method of any one of examples 1 to 4, where performing the noise monitoring scan includes performing the noise monitoring scan for a plurality of frames at a first frequency, a second frequency, and a third frequency, and where collecting the noise data from the noise monitoring scan further includes: collecting the noise data for the first frequency, the second frequency, and the third frequency; calculating a first maximum standard deviation for the first frequency, a second maximum standard deviation for the second frequency, and a third maximum standard deviation for the third frequency; and determining that the first maximum standard deviation is less than the second maximum standard deviation and the third maximum standard deviation.

Example 6. The method of any one of examples 1 to 5, further including: performing a mutual scan on a current frame of the touchscreen device; collecting strength data from the mutual scan for the current frame; and calculating a current standard deviation of the strength data for the current frame, where applying the second noise filter includes: calculating a standard deviation difference between the current standard deviation and the first maximum standard deviation; comparing the standard deviation difference and a hopping threshold; determining the standard deviation difference is greater than the hopping threshold; and setting a mutual scan frequency to the first frequency for subsequent mutual scans in response to determining that the standard deviation difference is greater than the hopping threshold.

Example 7. The method of any one of examples 1 to 6, where applying the second noise filter further includes: performing two or more mutual scans on a same portion of a frame for the subsequent mutual scans on the touchscreen device; collecting strength data from each of the two or more mutual scans; calculating an average strength of the strength data from the two or more mutual scans; and reporting a touch input in response to the calculated average strength exceeding a touch reporting threshold.

Example 8. A second example includes another method of operating a touchscreen device. The method including: performing a first noise monitoring scan on the touchscreen device; collecting first noise data from the first noise monitoring scan; determining that the first noise data is greater than a first noise threshold and less than a second noise threshold, the second noise threshold being larger than the first noise threshold; entering a first noise mode in response to the first noise data being greater than the first noise threshold and less than the second noise threshold; performing a second noise monitoring scan on the touchscreen device; collecting second noise data from the second noise monitoring scan; determining that the second noise data is greater than the second noise threshold; and entering a second noise mode in response to the second noise data exceeding the second noise threshold, the second noise mode comprises performing two or more mutual scans on a same portion of a frame.

Example 9. The method of example 8, where the first noise mode further includes: adding a touch delay; increasing a touch reporting threshold; and reporting a touch input based on the added touch delay and the increased touch reporting threshold.

Example 10. The method of one of examples 8 or 9, where the second noise mode further includes: collecting strength data from each of the two or more mutual scans; calculating an average strength of the strength data from the two or more mutual scans; and reporting a touch input in response to the calculated average strength exceeding the touch reporting threshold.

Example 11. The method of any one of examples 8 to 10, where the second noise mode further includes: setting a mutual scan frequency for subsequent mutual scans based on the second noise data from the second noise monitoring scan; and performing the subsequent mutual scans at the set mutual scan frequency.

Example 12. The method of any one of examples 8 to 11, where: performing the second noise monitoring scan includes performing the second noise monitoring scan for a second plurality of frames at a first frequency, a second frequency, and a third frequency; and collecting the second noise data from the second noise monitoring scan includes: collecting the second noise data from a plurality of sense channels for the second plurality of frames for the first frequency, the second frequency, and the third frequency; calculating a first maximum standard deviation for the first frequency, a second maximum standard deviation for the second frequency, and a third maximum standard deviation for the third frequency; and determining that the first maximum standard deviation is less than the second maximum standard deviation and the third maximum standard deviation.

Example 13. The method of any one of examples 8 to 12, further including: performing a first mutual scan on a current frame of the touchscreen device before entering the second noise mode; collecting strength data from the first mutual scan for the current frame; and calculating a current standard deviation of the strength data for the current frame. The second noise mode further includes: calculating a standard deviation difference between the current standard deviation and the first maximum standard deviation; comparing the standard deviation difference and a hopping threshold; determining whether the standard deviation difference is greater than the hopping threshold; and setting a mutual scan frequency for the two or more mutual scans to the first frequency in response to the standard deviation difference being greater than the hopping threshold; where performing the two or more mutual scans on the same portion of a frame includes: performing the two or more subsequent mutual scans on a same portion of a frame at the set mutual scan frequency; collecting strength data from each of the two or more mutual scans; calculating an average strength of the strength data from the two or more mutual scans; and reporting a touch input in response to the calculated average strength exceeding the touch reporting threshold.

Example 14. A third example includes a device that includes: a touchscreen; and a touch controller. The touch controller is configured to: perform a noise monitoring scan on the touchscreen; collect noise data from the noise monitoring scan; determine whether the noise data is greater than a first noise threshold and less than a second noise threshold or whether the noise data is greater than the second noise threshold, the second noise threshold being larger than the first noise threshold; operate in a first noise mode to apply a first noise filter in response to the noise data being greater than the first noise threshold and less than the second noise threshold; and operate in a second noise mode to apply a second noise filter in response to the noise data being greater than the second noise threshold.

Example 15. The device of example 14, where, when the touch controller operates in the first noise mode, the touch controller is further configured to: add a touch delay so that reporting touch inputs are delayed by a number of frames; and increase a touch reporting threshold; and report a touch input based on the touch delay and the touch reporting threshold.

Example 16. The device of one of examples 14 or 15, where, when the touch controller operates in the second noise mode, the touch controller is further configured to: perform two or more mutual scans on a same portion of a frame on the touchscreen; collect strength data from each of the two or more mutual scans; calculate an average strength of the strength data from the two or more mutual scans; and report a touch input in response to the calculated average strength exceeding a touch reporting threshold.

Example 17. The device of one of examples 14 to 16, where, when the touch controller operates in the second noise mode, the touch controller is further configured to set a mutual scan frequency based on the noise data from the noise monitoring scan.

Example 18. The device of one of examples 14 to 17, where the touch controller is further configured to: perform the noise monitoring scan for a plurality of frames at a first frequency, a second frequency, and a third frequency; collect the noise data for the first frequency, the second frequency, and the third frequency; calculate a first maximum standard deviation for the first frequency, a second maximum standard deviation for the second frequency, and a third maximum standard deviation for the third frequency; and determine that the first maximum standard deviation is less than the second maximum standard deviation and the third maximum standard deviation.

Example 19. The device of one of examples 14 to 18, where the touch controller is further configured to: perform a mutual scan on a current frame of the touchscreen; collect strength data from the mutual scan for the current frame; calculate a current standard deviation of the strength data for the current frame; calculate a standard deviation difference between the current standard deviation and the first maximum standard deviation; compare the standard deviation difference and a hopping threshold; determine whether the standard deviation difference is greater than the hopping threshold; and set a mutual scan frequency to the first frequency in response to the standard deviation difference being greater than the hopping threshold.

Example 20. The device of one of examples 14 to 19, wherein, when the touch controller operates in the second noise mode, the touch controller is further configured to: perform two or more mutual scans on a same portion of a frame at the set mutual scan frequency; collect strength data from each of the two or more mutual scans; calculate an average strength of the strength data from the two or more mutual scans; and reporting a touch input in response to the calculated average strength exceeding a touch reporting threshold.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device comprising:
- a touchscreen; and
- a touch controller configured to:
  - perform a noise monitoring scan on the touchscreen;
  - collect noise data from the noise monitoring scan;
  - determine whether the noise data is greater than a first noise threshold and less than a second noise threshold or whether the noise data is greater than the second noise threshold, the second noise threshold being larger than the first noise threshold;
  - operate in a first noise mode to apply a first noise filter in response to the noise data being greater than the first noise threshold and less than the second noise threshold, wherein, when the touch controller operates in the first noise mode, the touch controller is further configured to add a touch delay so that reported touch inputs are delayed by a number of frames, increase a touch reporting threshold, and report a touch input based on the touch delay and the increased touch reporting threshold; and
  - operate in a second noise mode to apply a second noise filter in response to the noise data being greater than the second noise threshold.

2. The device of claim 1, wherein, when the touch controller operates in the second noise mode, the touch controller is further configured to:
- perform two or more mutual scans on a same portion of a frame on the touchscreen;
- collect strength data from each of the two or more mutual scans;
- calculate an average strength of the strength data from the two or more mutual scans; and
- report the touch input in response to the calculated average strength exceeding the touch reporting threshold.

3. The device of claim 1, wherein, when the touch controller operates in the second noise mode, the touch controller is further configured to set a mutual scan frequency based on the noise data from the noise monitoring scan.

4. The device of claim 1, wherein the touch controller is further configured to:
- perform the noise monitoring scan for a plurality of frames at a first frequency, a second frequency, and a third frequency;
- collect the noise data for the first frequency, the second frequency, and the third frequency;
- calculate a first maximum standard deviation for the first frequency, a second maximum standard deviation for the second frequency, and a third maximum standard deviation for the third frequency; and
- determine that the first maximum standard deviation is less than the second maximum standard deviation and the third maximum standard deviation.

5. The device of claim 4, wherein the touch controller is further configured to:
- perform a mutual scan on a current frame of the touchscreen;
- collect strength data from the mutual scan for the current frame;
- calculate a current standard deviation of the strength data for the current frame;
- calculate a standard deviation difference between the current standard deviation and the first maximum standard deviation;
- compare the standard deviation difference and a hopping threshold;
- determine whether the standard deviation difference is greater than the hopping threshold; and
- set a mutual scan frequency to the first frequency in response to the standard deviation difference being greater than the hopping threshold.

6. The device of claim 5, wherein, when the touch controller operates in the second noise mode, the touch controller is further configured to:
- perform two or more mutual scans on a same portion of a frame at the set mutual scan frequency;
- collect strength data from each of the two or more mutual scans;
- calculate an average strength of the strength data from the two or more mutual scans; and
- report the touch input in response to the calculated average strength exceeding the touch reporting threshold.

7. A method of operating a touchscreen device, the method comprising:
- performing a noise monitoring scan on the touchscreen device;
- collecting noise data from the noise monitoring scan;
- determining whether the noise data is greater than a first noise threshold and less than a second noise threshold and, if not, whether the noise data is greater than the second noise threshold, the second noise threshold being larger than the first noise threshold;
- entering a first noise mode to apply a first noise filter in response to the noise data being greater than the first noise threshold and less than the second noise threshold, wherein applying the first noise filter comprises adding a touch delay so that reported touch inputs are delayed by a number of frames, increasing a touch reporting threshold, and reporting a touch input based on the added touch delay and the increased touch reporting threshold; and
- entering a second noise mode to apply a second noise filter in response to the noise data being greater than the second noise threshold.

8. The method of claim 7, wherein applying the second noise filter comprises:
- performing two or more mutual scans on a same portion of a frame on the touchscreen device;
- collecting strength data from each of the two or more mutual scans;

calculating an average strength of the strength data from the two or more mutual scans; and reporting the touch input in response to the calculated average strength exceeding the touch reporting threshold.

9. The method of claim 7, wherein applying the second noise filter comprises:

setting a mutual scan frequency for subsequent mutual scans based on the noise data from the noise monitoring scan;

performing two or more mutual scans on a same portion of a frame at the mutual scan frequency based on the noise data;

collecting strength data from each of the two or more mutual scans;

calculating an average strength of the strength data from the two or more mutual scans; and reporting the touch input in response to the calculated average strength exceeding the touch reporting threshold.

10. The method of claim 7, wherein performing the noise monitoring scan comprises performing the noise monitoring scan for a plurality of frames at a first frequency, a second frequency, and a third frequency, and wherein collecting the noise data from the noise monitoring scan further comprises:

collecting the noise data for the first frequency, the second frequency, and the third frequency;

calculating a first maximum standard deviation for the first frequency, a second maximum standard deviation for the second frequency, and a third maximum standard deviation for the third frequency; and determining that the first maximum standard deviation is less than the second maximum standard deviation and the third maximum standard deviation.

11. The method of claim 10, further comprising:

performing a mutual scan on a current frame of the touchscreen device;

collecting strength data from the mutual scan for the current frame; and calculating a current standard deviation of the strength data for the current frame, wherein applying the second noise filter comprises:

calculating a standard deviation difference between the current standard deviation and the first maximum standard deviation;

comparing the standard deviation difference and a hopping threshold;

determining the standard deviation difference is greater than the hopping threshold; and setting a mutual scan frequency to the first frequency for subsequent mutual scans in response to determining that the standard deviation difference is greater than the hopping threshold.

12. The method of claim 11, wherein applying the second noise filter further comprises:

performing two or more mutual scans on a same portion of a frame for the subsequent mutual scans on the touchscreen device;

collecting strength data from each of the two or more mutual scans;

calculating an average strength of the strength data from the two or more mutual scans; and reporting the touch input in response to the calculated average strength exceeding the touch reporting threshold.

13. A method of operating a touchscreen device, the method comprising:

performing a first noise monitoring scan on the touchscreen device;

collecting first noise data from the first noise monitoring scan;

determining that the first noise data is greater than a first noise threshold and less than a second noise threshold, the second noise threshold being larger than the first noise threshold;

entering a first noise mode in response to the first noise data being greater than the first noise threshold and less than the second noise threshold, wherein the first noise mode comprises adding a touch delay, increasing a touch reporting threshold, and reporting a touch input based on the added touch delay and the increased touch reporting threshold;

performing a second noise monitoring scan on the touchscreen device;

collecting second noise data from the second noise monitoring scan;

determining that the second noise data is greater than the second noise threshold; and entering a second noise mode in response to the second noise data exceeding the second noise threshold, wherein the second noise mode comprises performing two or more mutual scans on a same portion of a frame.

14. The method of claim 13, wherein the second noise mode further comprises:

collecting strength data from each of the two or more mutual scans;

calculating an average strength of the strength data from the two or more mutual scans; and reporting the touch input in response to the calculated average strength exceeding the touch reporting threshold.

15. The method of claim 13, wherein the second noise mode further comprises:

setting a mutual scan frequency for subsequent mutual scans based on the second noise data from the second noise monitoring scan; and performing the subsequent mutual scans at the set mutual scan frequency.

16. The method of claim 13, wherein:

performing the second noise monitoring scan comprises performing the second noise monitoring scan for a second plurality of frames at a first frequency, a second frequency, and a third frequency; and collecting the second noise data from the second noise monitoring scan comprises:

collecting the second noise data from a plurality of sense channels for the second plurality of frames for the first frequency, the second frequency, and the third frequency;

calculating a first maximum standard deviation for the first frequency, a second maximum standard deviation for the second frequency, and a third maximum standard deviation for the third frequency; and determining that the first maximum standard deviation is less than the second maximum standard deviation and the third maximum standard deviation.

17. The method of claim 16, further comprising:

performing a first mutual scan on a current frame of the touchscreen device before entering the second noise mode;

collecting strength data from the first mutual scan for the current frame;

calculating a current standard deviation of the strength data for the current frame;

wherein the second noise mode further comprises:

calculating a standard deviation difference between the current standard deviation and the first maximum standard deviation;

comparing the standard deviation difference and a hopping threshold;

determining whether the standard deviation difference is greater than the hopping threshold; and setting a mutual scan frequency for the two or more mutual scans to the first frequency in response to the standard deviation difference being greater than the hopping threshold;

wherein performing the two or more mutual scans on the same portion of the frame comprises:

performing two or more subsequent mutual scans on the same portion of the frame at the set mutual scan frequency;

collecting strength data from each of the two or more mutual scans;

calculating an average strength of the strength data from the two or more mutual scans; and reporting the touch input in response to the calculated average strength exceeding the touch reporting threshold.

* * * * *